(12) United States Patent
Miyabayashi

(10) Patent No.: US 6,590,012 B2
(45) Date of Patent: *Jul. 8, 2003

(54) INK COMPOSITION CAPABLE OF REALIZING LIGHT FAST IMAGE

(75) Inventor: Toshiyuki Miyabayashi, Suwa (JP)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/067,389

(22) Filed: Apr. 28, 1998

(65) Prior Publication Data

US 2001/0009933 A1 Jul. 26, 2001

(30) Foreign Application Priority Data

Apr. 28, 1997 (JP) ................................. 9-111435

(51) Int. Cl.⁷ .................. C09D 11/10; C08L 25/00; C08L 31/02; C08L 39/04
(52) U.S. Cl. ................ 523/160; 524/548; 524/553; 524/556; 524/577
(58) Field of Search ................ 523/160, 161; 106/31.27, 31.28, 31.6; 524/91, 336, 100, 299, 291, 720, 718, 721, 725, 359, 548, 553, 556, 577

(56) References Cited

U.S. PATENT DOCUMENTS

| | | | | |
|---|---|---|---|---|
| 3,076,782 A | * | 2/1963 | Mohr et al. ............... 524/91 |
| 3,337,356 A | * | 8/1967 | Carboni ................... 252/588 |
| 3,370,036 A | * | 2/1968 | Martinovich et al. ....... 524/299 |
| 3,642,669 A | * | 2/1972 | Nast ...................... 521/170 |
| 3,935,163 A | * | 1/1976 | Spivack et al. ............. 524/91 |
| 4,043,962 A | * | 8/1977 | Adler et al. .............. 260/29.3 |
| 4,210,612 A | * | 7/1980 | Karrer .................... 525/204 |
| 4,256,493 A | * | 3/1981 | Yokoyama et al. ........ 106/31.58 |
| 4,413,075 A | * | 11/1983 | Di Battista ............... 524/102 |
| 4,467,061 A | * | 8/1984 | Yamamoto et al. .......... 524/87 |
| 4,504,628 A | * | 3/1985 | Johnson .................. 525/278 |
| 4,537,923 A | | 8/1985 | Slongo et al. ............. 524/100 |
| 4,605,596 A | * | 8/1986 | Fry ....................... 428/423.3 |
| 4,891,396 A | * | 1/1990 | Avar et al. ................ 524/91 |
| 5,124,723 A | * | 6/1992 | Laver ..................... 347/100 |
| 5,262,459 A | * | 11/1993 | Kotani et al. .............. 524/91 |
| 5,348,580 A | * | 9/1994 | Chassot .................. 106/410 |
| 5,350,786 A | * | 9/1994 | Costanzi et al. ........... 524/102 |
| 5,510,415 A | * | 4/1996 | Zahrobsky et al. ......... 524/506 |
| 5,624,982 A | * | 4/1997 | Chang et al. .............. 524/91 |
| 5,686,633 A | * | 11/1997 | Vieira et al. .............. 549/464 |
| 5,746,814 A | * | 5/1998 | Malhotra et al. ........... 106/18 |
| 5,814,685 A | * | 9/1998 | Satake et al. ............. 523/201 |
| 5,837,754 A | * | 11/1998 | Shimomura et al. ........ 523/161 |
| 5,846,306 A | * | 12/1998 | Kubota et al. ........... 106/31.75 |
| 5,859,113 A | * | 1/1999 | McIntyre et al. ........... 524/460 |
| 5,891,961 A | * | 4/1999 | Kawamura et al. ......... 525/169 |
| 5,990,202 A | * | 11/1999 | Nguyen et al. ............. 523/201 |
| 6,121,365 A | * | 9/2000 | Saibara et al. ............ 524/458 |

FOREIGN PATENT DOCUMENTS

| | | |
|---|---|---|
| EP | 0739743 | 10/1996 |
| EP | 0761783 | 3/1997 |

OTHER PUBLICATIONS

Brandup, J., Immergut, E.H., and Gulke, E.A.; Polymer Handbook, 4th Ed., John Wiley and Sons, New York (pp. VI 229–VI 231), 1999.*
Morgans, W.M.; Outlines of Paint Technology, vol. 1, John Wiley and Sons, New York (pp. 273–274), 1982.*
Modern Plastics Encyclopedia, Mc–Graw–Hill, New York (pp. 528–536 and 545), 1967.*
English Translation of JP 09241327 A (1997).*

* cited by examiner

Primary Examiner—Callie Shosho
(74) Attorney, Agent, or Firm—Ladas & Parry

(57) ABSTRACT

Addition of a polymer having an ultraviolet absorbing capacity and/or a light stabilizing capability and, in addition, a film-forming property as a fine particle to an ink composition can improve the lightfastness of the ink composition. The use of an ink composition comprising a colorant, water, a water-soluble organic solvent, and a fine particle of a polymer, the polymer constituting the fine particle having a film-forming property and, at the same time, an ultraviolet absorbing capacity and/or a light stabilizing capability, can realize a lightfast printed image.

20 Claims, 6 Drawing Sheets

INK COMPOSITION CAPABLE OF REALIZING LIGHT FAST IMAGE

BACKGROUND OF THE INVENTION

1. Field of the Invention

The present invention relates to an ink composition, and more particularly to an ink composition suitable for ink jet recording.

2. Background Art

Use of a solvent for dissolving or dispersing a colorant is indispensable to recording methods using an ink composition. A mixed solvent composed of water and a water-soluble organic solvent has been extensively used as the solvent component from the viewpoint of safety. Upon application of an ink composition on a recording medium, the solvent penetrates the recording medium or evaporates to permit the colorant to be fixed onto the recording medium, thereby recording letters or other images on the recording medium. Various properties are required of the formed images.

Regarding lightfastness among the property requirements, various proposals have been made in the art to improve this property. Water-soluble dyes, by virtue of good water solubility, have been extensively used as a colorant for water-base ink compositions. However, it has been pointed out that the water-soluble dyes generally have poor lightfastness. In order to solve this problem, an ink composition with a colorant, not soluble in water, having excellent lightfastness, such as a pigment, being dispersed therein has been proposed in the art.

However, it has been pointed out that, although inorganic pigments, such as carbon black, and metal-containing organic pigments, such as copper phthalocyanine pigment, are excellent in lightfastness, most of the other organic pigments cannot produce an image having satisfactory lightfastness. Therefore, improving the lightfastness of the ink composition using an organic pigment as the colorant has been required in the art.

On the other hand, dyes are attractive in that the number of kinds of dyes usable in the Ink composition is large. Therefore, also in the case of the ink composition comprising a dye as the colorant, improving the lightfastness of the printed image has been desired in the art.

In recent years, formation of a color image using a plurality of ink compositions has been carried out. In the color image using the plurality of ink compositions, the presence of only one color having poor lightfastness leads to a change in hue of the image and consequently extremely deteriorates the quality of the color image. Thus, more controlled lightfastness is required of color ink compositions.

Further, in recent years, ink jet recording printers have become widely spread. Ink jet recording is a printing method wherein droplets of an ink composition are ejected and deposited onto a recording medium such as paper to conduct printing. This printing method is advantageous in that a high-resolution, high-quality image can be printed at a high speed using a relatively inexpensive apparatus. In particular, a color ink jet recording apparatus can provide an improved image quality and has become used as an output device for photographs and also as a digital printer, a plotter, a CAD output device and the like. Images printed by the ink jet recording printer which has become widely used in the art are considered to be utilized in various forms. In particular, photograph-like prints are considered to be put for display in a place exposed to light from a fluorescent lamp or direct sunlight in the open for a long period of time. Therefore, lightfastness is a very important property requirement to be satisfied by the ink composition used in the ink jet recording.

Addition of an ultraviolet absorber or a light stabilizer to the ink composition is considered effective for improving the lightfastness of the ink composition. Since, however, most of the ultraviolet absorbers and the light stabilizers are oil soluble, incorporation thereof in a satisfactory amount in the water-soluble ink composition is difficult.

On the other hand, a new ink jet recording method has been recently proposed which comprises applying a polyvalent metal salt solution onto a recording medium and then applying an ink composition containing a dye material having at least one carboxyl group (for example, Japanese Patent Laid-Open No. 202328/1993). According to this method, polyvalent metal ions combine with the dye to form an insoluble composite which can provide a high-quality image having waterfastness and free from color bleeding.

Further, an ink jet recording method has been proposed wherein a color ink containing at least a surfactant or a penetrable solvent and a salt for imparting a penetrating property is used in combination with a black ink which cooperates with the salt to cause thickening or agglomeration, thereby providing a high-quality color image having high image density and free from color bleeding (Japanese Patent Laid-Open No. 106735/1994). More specifically, in this method, two liquids, i.e., a first liquid containing a salt and a second liquid of an ink composition, are printed to provide a good image.

Furthermore, other ink jet recording methods wherein two liquids are printed have been proposed, for example, in Japanese Patent Laid-Open No. 240557/1991 and No. 240558/1991.

SUMMARY OF THE INVENTION

The present inventors now propose a technique for improving the lightfastness of an ink composition wherein a polymer having an ultraviolet absorbing capacity and/or a light stabilizing capability and, in addition, a film-forming property are added as a fine particle to the ink composition.

Accordingly, an object of the present invention is to provide an ink composition which can realize a printed image having excellent lightfastness.

More specifically, the present invention aims to provide an ink composition which can produce an image excellent in lightfastness as well as in rubbing/scratch resistance and waterfastness and, in addition, having an excellent print quality free from feathering or color bleeding.

Another object of the present invention is to provide an ink composition which can be highly stably ejected in ink jet recording and in addition possesses excellent storage stability.

A further object of the present invention is to provide an ink composition which, when used in a recording method using the so-called "two liquids," can yield an image having good quality, especially an image free from feathering and color bleeding.

According to the present invention, there is provided an ink composition comprising a colorant, water, a water-soluble organic solvent, and a fine particle of a polymer, the fine particle comprising a polymer having a film-forming property, an ultraviolet absorbing capacity and/or a light stabilizing capability.

DETAILED DESCRIPTION OF THE INVENTION

1. Ink Composition

Figure 1:
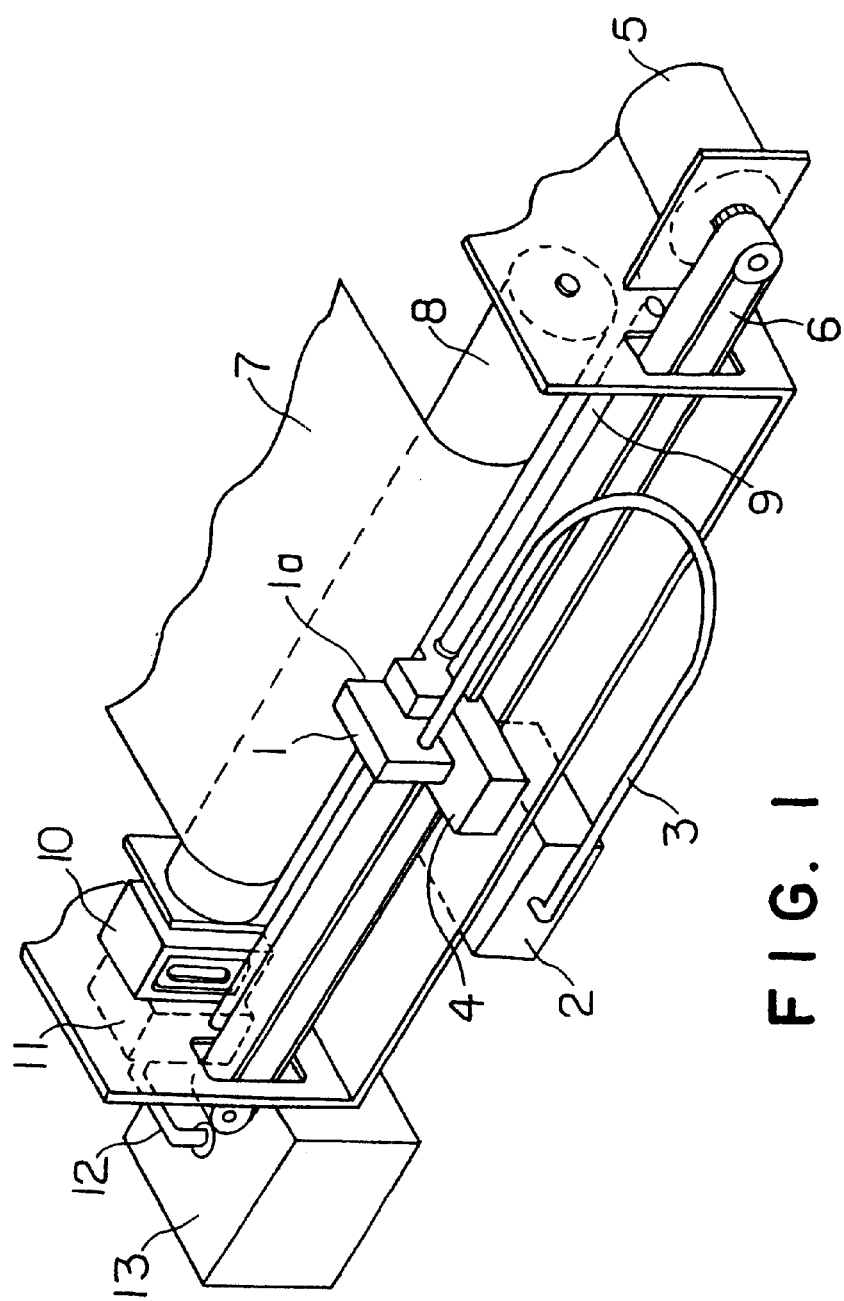
FIG. 1 is a diagram showing an ink jet recording apparatus usable in practicing the method according to the present invention, wherein a recording head is provided separately from an ink tank and an ink composition is fed into the recording head through an ink tube.

The ink composition according to the present invention may be used in recording methods using an ink composition. Recording methods using an ink composition include, for example, an ink jet recording method, a recording method using writing utensils, such as pens, and other various printing methods. Particularly preferably, the ink composition according to the present invention is used in the ink Jet recording method.

The ink composition according to the present invention basically comprises a colorant, water, a water-soluble organic solvent, and a fine particle of a polymer. The polymer constituting the fine particle has a film-forming property and, in addition, an ultraviolet absorbing capacity and/or a light stabilizing capability.

2. Fine Particle of Polymer

The fine particle of a polymer used in the ink composition of the present invention has a film-forming property.

In the present invention, the fine particle of the polymer having a film-forming property refers to a fine particle of a polymer which, when an ink composition containing it is dried, forms a homogeneous film. On the condition that the following theory is hypothetical and the present invention is not limited by the theory, the reason why the ink composition of the present invention can realize an image having excellent lightfastness is as follows. Upon deposition of the ink composition of the present invention on a recording medium, the solvent component penetrates the recording medium or evaporates, permitting a colorant to be fixed onto the recording medium. In this case, since the fine particle of the polymer contained in the ink composition has a film-forming property, the film is formed so as to cover the colorant component. This film is made of a polymer having an ultraviolet absorbing capacity and/or a light stabilizing capability and hence has an ultraviolet absorbing capacity and/or a light stabilizing capability. More specifically, when the colorant is a pigment, the formed film contains a pigment dispersed therein. Ultraviolet light is cut off by the film and does not reach the pigment dispersed in the film, and, hence, the printed image has lightfastness. On the other hand, when the colorant is a dye, it is considered that a film with the dye incorporated therein is formed on the surface of a recording medium and, at the same time, a part of the dye dyes the recording medium and is fixed within the recording medium. In this case, ultraviolet light is cut off by this film and does not reach the dye incorporated in the film or the recording medium in its layer, underlying the film, with the dye fixed therein, realizing a lightfast image.

According to a preferred embodiment of the present invention, the diameter of the fine particle of the polymer is preferably about 5 to 200 nm, more preferably about 5 to 100 nm.

The content of the fine particle of the polymer in the ink composition of the present invention is preferably about 1 to 10% by weight, more preferably about 1 to 5% by weight, based on the ink composition.

According to a preferred embodiment of the present invention, the fine particle of the polymer has a single-particle structure. According to another preferred embodiment of the present invention, the fine particle of the polymer has a core/shell structure comprising a core surrounded by a shell layer.

According to a preferred embodiment of the present invention, the fine particle of the polymer is present, as a dispersed particle of a polymer emulsion, in the ink composition. Specifically, in the preparation of the ink composition of the present invention, preferably, the fine particle of the polymer is mixed in the form of a polymer emulsion with ingredients of the ink composition According to a preferred embodiment of the present invention, the diameter of the fine particle of the polymer in the polymer emulsion is not more than about 200 nm, more preferably about 5 to 100 nm.

According to a preferred embodiment of the present invention, the polymer constituting the fine particle has a glass transition point of 30° C. or below. Use of this polymer enables the ink composition of the present invention to more surely form a film at room temperature.

According to a preferred embodiment of the present invention, when the fine particle of the polymer is present, in the ink composition, as a dispersed particle of a polymer emulsion, the minimum film-forming temperature of the polymer emulsion is 30° C. or below. In this case, the term "minimum film-forming temperature" used herein refers to a minimum temperature at which, when the polymer emulsion is thinly cast onto a sheet of a metal, such as aluminum, to form a coating which is then gradually heated, a transparent, continuous film is formed. This embodiment can improve fast drying, drying to the touch, rubbing/scratch resistance, and waterfastness of prints.

According to a preferred embodiment of the present invention, the fine particle comprises a thermoplastic polymer. The polymer may be a crosslinked one Examples of thermoplastic polymers usable herein include, but are not limited to, an ethylene/vinyl acetate copolymer, an ethylene/ethyl acrylate copolymer, polyethylene, polypropylene, polystyrene, a poly(meth)acrylic ester, a (meth)acrylic acid/styrene copolymer, a (meth)acrylic ester/(meth)acrylic acid copolymer, a styrene/maleic acid copolymer, a styrene/itaconic ester copolymer, polyvinyl acetate, polyester, polyurethane, and polyamide.

According to a first preferred embodiment of the present invention, the polymer constituting the fine particle contains an ultraviolet absorber and/or a light stabilizer.

According to a second preferred embodiment of the present invention, the polymer constituting the fine particle has in its structure a site possessing an ultraviolet absorbing capacity and/or a light stabilizing capability.

As described above, since most of the ultraviolet absorbers and the light stabilizers are oil soluble, incorporation thereof in a satisfactory amount in a water-soluble ink composition is difficult. By contrast, the present invention can provide a water-soluble ink composition which can impart satisfactory lightfastness to an image printed using it. Further, in both the first and second preferred embodiments of the present invention, basically, the amount of the site having an ultraviolet absorbing capacity and/or a light stabilizing capability present in the fine particle of the polymer and the amount of the ultraviolet absorber and/or the light stabilizer present in the fine particle of the polymer can be set as desired, making it possible to set the ultraviolet absorbing capacity and/or the light stabilizing capability as desired.

The definitions of the "ultraviolet absorbing capacity and ultraviolet absorber" and the "light stabilizing capability and light stabilizer" follow the definitions accepted in the art. Specifically, according to the function and the mechanism, the "ultraviolet absorbing capacity or ultraviolet absorber" generally means such a capacity or an agent that can gradually convert strong energy of ultraviolet light by utilizing keto-enol tautomerism to heat energy which is then released, thereby achieving stabilization. On the other hand, the "light stabilizing capability and light stabilizer" means such a capability or an agent that can achieve stabilization by utilizing radical capture, decomposition of hydroperoxide, scavenging of heavy metals, or quenching of singlet oxygen. The presence of any one of them suffices for attaining the object of the present invention. According to a preferred embodiment of the present invention, however, both of them are present.

2-1. Fine Particle of Polymer According to First Embodiment

The fine particle of the polymer according to the first embodiment of the present invention comprises a physical mixture of a polymer component, described below, with an ultraviolet absorber and/or a light stabilizer.

Ultraviolet absorbers and light stabilizers usable in the present Invention include benzophenone, benzotriazole, hindered phenol, salicylate, cyanoacrylate, and nickel complex salt ultraviolet absorbers and hindered amine light stabilizers.

More specifically, benzophenone ultraviolet absorbers usable herein include 2,4-dihydroxybenzophenone, 2-hydroxy-4-methoxybenzophenone, 2,2',4,4'-tetrahydroxybenzophenone.

Benzotriazole ultraviolet absorbers usable herein include 2-(2'-hydroxy-5'-methylphenyl)benzotriazole, 2-(2'-hydroxy-4'-octoxyphenyl)benzotriazol and 2-(2'-hydroxy-3'-tert-butyl-5'-methylphenyl)-5-chlorobenzotriazole.

Salicylate ultraviolet absorbers usable herein include phenyl salicylate, p-tert-butylphenyl salicylate, and p-octylphenyl salicylate.

Cyanoacrylate ultraviolet absorbers usable herein include ethyl-2-cyano-3,3'-diphenyl acrylate, methyl-2-cyano-3-methyl-3-(p-methoxyphenyl) acrylate, and butyl-2-cyano-3-methyl-3-(p-methoxyphenyl) acrylate.

Nickel complex salt ultraviolet absorbers usable herein include nickel bis(octylphenyl) sulfide, 2,2'-thiobis(4-tert-octylphenylate)-n-butylamine nickel (II), 2,2'-thiobis(4-tert-octylphenylate)-2-ethylhemylamine nickel (II), and 2,2'-thiobis(4-tert-octylphenylate)triethanolamine nickel (II).

Hindered amine light stabilizers usable herein include those having a 2,2,6,6-tetramethylpiperidine skeleton, and examples thereof include 2,2,6,6-tetramethylpiperidin-1-oxyl(triacetone-amine-N-oxyl).

Commercially available ultraviolet absorbers and light stabilizers may also be used. Specific examples thereof are as follows.

Commercially available benzophenone ultraviolet absorbers include:

2,4-dihydroxybenzophenone (SEESORB 100 (Shipro Kasei), Viosorb 100 (Kyodo Chemical), UVINUL 400 (BASF), and Inhibitor DHBP (Eastman Kodak));

2-hydroxy-4-methoxybenzophenone (Sumisorb 110 (Sumitomo), SEESORB 101 (Shipro Kasei), Viosorb 110 (Kyodo Chemical), UVINUL M-40 (BASF), Cyasorb UV 9 (ACC), and Tomisorb 300 (Yoshitomi Fine Chemicals));

2-hydroxy-4-methoxybenzophenone-5-sulfonic acid (SEESORB 101 S (Shipro Kasei), UVINUL MS-40 (BASF), Cyasorb UV 284 (ACC), and Harisorb 101 S (Yoshitomi Fine Chemicals));

2-hydroxy-4-n-octoxybenzophenone (ADK STAB 1413 (Asahi Denka Kogyo), Sumisorb 130 (Sumitomo), SEESORB 102 (Shipro Kasei), Viosorb 530 (Kyodo Chemical), Cyasorb UV 531 (ACC), Tomisorb 800 (Yoshitomi Fine Chemicals), and Harisorb 108 (Harima Kasei Kogyo));

2-hydroxy-4-n-dodecyloxybenzophenone (Inhibitor DHBP (Eastman Kodak), SEESORB 103 (Shipro Kasei), and UV-ehek Ald-320 (Fero));

bis(5-benzoyl-4-hydroxy-2-methoxyphenyl)methane (ADK STAB LA-51 (Asahi Denka Kogyo));

2,2'-dihydroxy-4-methoxybenzophenone Cyasorb UV 24 (ACC)); and 2,2'-dihydroxy-4,4'-dimethoxybenzophenone (UVINUL D-49 (BASF)).

Commercially available benzotriazole ultraviolet absorbers usable herein Include:

2-(2'-hydroxy-5'-methylphenyl)benzotriazole (ADK STAB LA-32 (Asahi Denka Kogyo), Sumisorb 200 (Sumitomo), SEESORB 701 (Shipro Kasei), TINUVIN P (Ciba-Geigy), Viosorb 520 (Kyodo Chemical), and JF-77 (Johoku Chemical));

2-[2'-hydroxy-3',5'-bis(α,α-dimethylbenzyl)phenyl]benzotriazole (TINUVIN 234 (Ciba-Geigy));

2-(2'-hydroxy-3',5'-di-t-butyl-phenyl)benzotriazole (ADK STAB LA-38 (Asahi Denka Kogyo), Sumisorb 320 (Sumitomo), SEESORB 705 (Shipro Kasei), TINUVIN 320 (Ciba-Geigy), and Viosorb 582 (Kyodo Chemical));

2-(2'-hydroxy-3-t-butyl-5'-methylphenyl)-5-chlorobenzotriazole (ADK STAB LA-36 (Asahi Denka Kogyo), Sumisorb 300 (Sumitomo), SEESORB 703 (Shipro Kasei), TINUVIN 326 (Ciba-Geigy), Viosorb (Kyodo Chemical), Tomisorb (Yoshitomi Fine Chemicals), and JF-600 (Johoku Chemical));

2-(2'-hydroxy-3',5'-di-t-butylphenyl)-5-chlorobenzotriazole (ADK STAB LA-34 (Asahi Denka Kogyo), SEESORB 702 (Shipro Kasei), TINUVIN 327 (Ciba-Geigy), and Viosorb 580 (Kyodo Chemical));

2-(2'-hydroxy-3',5'-di-t-amyl)-benzotriazole (Sumisorb 350 (Sumitomo), SEESORB 704 (Shipro Kasei), TINUVIN 328 (Ciba-Geigy), and Viosorb 591 (Kyodo Chemical));

2-(2'-hydroxy-5'-t-octylphenyl )-benzotriazole (Sumisorb 340 (Sumitomo), SEESORB 709 (Shipro Kasei), Viosorb 583 (Kyodo Chemical), JF-83 (Johoku Chemical), and Cyasorb UV 5411 (ACC)); and 2,2 '-methylenebis[4-(1,1,3,3-tetramethylbutyl)-6-(2N-benzotriazol-2-yl)phenol] (ADK STAB LA-31 (Asahi Denka Kogyo)).

Commercially available salicylate ultraviolet absorbers usable herein include:
phenyl salicylate (SEESORB 201 (Shipro Kasei), and Salol P (Iwaki & Co., Ltd.): and
4-t-butylphenyl salicylate (SEESORB 202 (Shipro Kassi), and Butisalol (Iwaki & Co., Ltd.)).

Commercially available cyanoacrylate ultraviolet absorbers usable herein include:
ethyl-2-cyano-3,3'-diphenyl acrylate (SEESORB 501 (Shipro Kasei), Viosorb 910 (Kyodo Chemical), and UVINUL N-589 (BASF)); and
2-ethylhexyl-2-cyano-3,3'-diphenyl acrylate (UVINUL N-589 (BASF)).

High-molecular weight ultraviolet absorbers usable herein are commercially available, and example thereof include MARK LA-51 and MARK LA-31 manufactured by Asahi Denka Kogyo, SEESORB 706 manufactured by Shipro Kasei Co., Ltd., and UVA 101 manufactured by Takemoto Oil & Fat Co., Ltd.

Commercially available hindered amine light stabilizers include:

bis-[2,2,6,6-tetramethyl-4-piperidinyl] sebacate (Sanol LS-770 (Sankyo) and ADK STAB LA-77 (Asahi Denka Kogyo));
bis-[N-methyl-2,2,6,6-tetramethyl-4-piperidinyl] sebacate (Tinuvin 765 (Ciba-Geigy) and SANOL LS 765 (Sankyo));
bis-(1,2,2,6,6-pentamethyl-4-piperidinyl)-2-(3,5-di-tetra-butyl-4-hydroxybenzyl)-2-n-butyl malonate (TINUVIN 144 (Ciba-Geigy) );
tetrakis(2,2,6,6-tetramethyl-4-piperidyl-1,2,3-4-butane tetracarboxylate (ADK STAB LA-57 (Asahi Denka Kogyo));
tetrakis(1,2,2,6,6-pentamethyl-4-piperidyl-1,2,3-4-butane tetracarboxylate (ADK STAB LA-52 (Asahi Denka Kogyo));
2,2,6,6-tetramethyl-4-piperidyl/tridecyl)-1,2,3,4-butane tetracarboxylate (ADK STAB LA-67 (Asahi Denka Kogyo)); and
1,2,2,6,6-pentamethyl-4-piperidyl/tridecyl)-1,2,3,4-butane tetracarboxylate (ADK STAB LA-62 (Asahi Denka Kogyo)).

According to a preferred embodiment of the present invention, addition of a phosphorus antioxidant in addition to the ultraviolet absorber and/or the light stabilizer is preferred. The addition of the phosphorus antioxidant can prevent discoloration of the polymer and discoloration of the additives and hence can advantageously prevent a change in hue of the ink composition and the printed image.

Preferred examples of methods for producing the fine particle of the polymer according to the first preferred embodiment of the present invention include: (1) a solution emulsion method which comprises adding an ultraviolet absorber and/or a light stabilizer to a system comprising a monomer as a reaction species and a polymerization catalyst, conducting polymerization, dissolving the resultant polymer in an organic solvent, and adding water to the polymer solution with stirring to form an emulsion; (2) a method wherein the polymer produced in the same manner as described above and an emulsifier are melt-kneaded or kneaded by means of kneader-mixer without using any solvent and water is added thereto little by little; and (3) a direct emulsification method wherein a melted polymer is gradually added to a heated aqueous emulsifier solution with stirring to conduct emulsification. According to another embodiment, the fine particle of the polymer may be produced by (4) a method which comprises reacting a polyol with a diisocyanate or a polyisocyanate in the presence of an ultraviolet absorber and/or a light stabilizer and a catalyst and emulsifying the resultant polyurethane.

According to still another embodiment, the fine particle of the polymer used in the present invention may be produced by conventional emulsion polymerization. Specifically, an ultraviolet absorber and/or a light stabilizer are dissolved in a monomer, and the monomer component and another monomer component are emulsion-polymerized in water in the presence of a polymerization catalyst and an emulsifier. Emulsifiers usable herein include anionic surfactants, non-ionic surfactants, and mixtures thereof. Anionic surfactants usable herein include salts of alkylsulfonic acids, alkylsulfone sulfates, salts of alkylbenzenesulfonic acids, salts of alkylnaphthalenesulfonic acids, alkylbenzenesulfone sulfates, salts of dialkylsulfosuccinic acid, salts of fatty acids, polyoxyethylene alkyl ether sulfates, and polyoxyethylene phenyl ether sulfates. Nonionic surfactants usable herein include polyoxyethylene alkyl ethers, polyoxyethylene alkylphenyl ethers, polyoxyethylene polystyrylphenyl other, polyoxyethylene-polyoxypropylene glycol, polyoxyethylone-polyoxypropylene alkyl ethers, polyoxyethylene fatty acid esters, and polyglycerin fatty acid esters. The emulsion polymerization is preferred for the production of a fine particle of a polymer in the form of a polymer emulsion. According to a preferred embodiment of the present invention, utilization of a surfactant having an HLB of 15 to 20 is preferred from the viewpoint of producing a stable polymer emulsion.

The monomer component used in the above production method is not particularly limited so far as it can provide the polymer component of the fine particle. Specific examples thereof include; vinyl esters, for example, acrylic esters or methacrylic esters, such as methyl (meth)acrylate, ethyl (meth)acrylate, isopropyl (meth)acrylate, n-butyl (meth)acrylate, isobutyl (meth)acrylate, n-amyl (meth)acrylate, isoamyl (meth)acrylate, n-hexyl (meth)acrylate, 2-ethylhexyl (meth)acrylate, octyl (meth)acrylate, decyl (meth)acrylate, dodecyl (meth)acrylate, octadecyl (meth)acrylate, cyclohexyl (meth)acrylate, phenyl (meth)acrylate, benzyl (meth)acrylate, 2-hydroxylethyl (meth)acrylate, hydroxypropyl (meth)acrylate, glycidyl methacrylate, and glycidyl acrylate, and vinyl acetate; acrylonitrile, methacrylonitrile and the like; aromatic vinyl compounds, such as styrene, 2-methylstyrene, vinyltoluene, t-butylstyrene, chlorostyrene, vinylanisole, vinylnaphthalene, and divinylbenzene; halogenated vinylidene, such as vinylidene chloride and vinylidene fluoride; ethylene, propylene, isopropylene, butadiene, vinylpyrrolidone, vinyl chloride, vinyl ether, vinyl ketone, chloroprene and the like, and carboxyl-containing compounds, for example, ethylenically unsaturated carboxylic acids, such as acrylic acid, methacrylic acid, maleic acid, or monoalkyl esters thereof, itaconic acid or monoalkyl esters thereof, fumaric acid or monoalkyl esters thereof; amido-containing compounds, such as acrylamide and N,N-dimethylacrylamide, and alkylamino esters of acrylic acid or methacrylic acid, for example, amino-containing compounds, such as N-methylaminoethyl methacrylate, N-methylaminoethyl acrylate, dimethylaminoethyl methacrylate, dimethylaminoethyl acrylate, diethylaminoethyl methacrylate, and diethylaminoethyl methacrylate; unsaturated amides containing an alkylamino group, such as N-(2-dimethylaminoethyl) acrylamide, N-(2-dimethylaminoethyl)methacrylamide, and N,N-dimethylaminopropylacrylamide, monovinylpyridines, such as vinylpyridine, and vinyl ethers containing an alkylamino group, such as dimethylaminoethyl vinyl ether; and vinylimidazole and the like and compounds containing a sulfonic group, such as vinylsulfonic acid, styrenesulfonic acid and salts thereof and 2-acryloylamino-2-methylpropanesulfonic acid and salts thereof. These monomers may be used alone or as a mixture of two or more.

As described above, the fine particle of the polymer may have either a single-particle structure or a core/shell structure. The fine particle of the polymer according to the first preferred embodiment also may have either a single-particle structure or a core/shell structure.

In this case, the fine particle of the polymer having a core/shell structure may be produced by any conventional method without particular limitation. For example, in general, it may be produced by multi-stage emulsion polymerization.

When the fine particle of the polymer has a core/shell structure, the ultraviolet absorber and/or the light stabilizer may be present in either the core or the shell layer, or alternatively may be present in both the core and the shell layer.

According to a preferred embodiment of the preset invention, the fine particle of the polymer according to the first preferred embodiment, independently of whether it has a single-particle structure or a core/shell structure, has a carboxyl group or a sulfonic group as a functional group and further preferably has an amido group, a hydroxyl group, or an amino group. In the case of the core/shell structure, the presence of the above functional groups in the shell layer is preferred. These groups may be allowed to exist in the structure of the monomer in the above production method. Alternatively, after the fine particle of the polymer is produced, the groups may be added onto the surface thereof by graft polymerization or the like. The presence of the above groups is considered preferable from the viewpoint of the following expected mechanism. However, it should be noted that the following theory is merely hypothetical and the present invention is not limited to the theory. Hydrophilic groups, such as carboxyl, sulfonic, amido, amino, and hydroxyl groups, present on the surface of the polymer particle are bonded to a hydroxyl group (an OH group) of cellulose constituting paper fibers by hydrogen bonding, permitting the fine particle of the polymer to be strongly adsorbed onto the paper fibers. This inhibits penetration of a colorant, such as a pigment, into the paper. In particular, when the fine particle of the polymer has a core/shell structure with a hydrophilic group, such as a carboxyl, sulfonic, amido, amino, or hydroxyl group, being contained in the shell layer, the proportion of the hydrophilic group present on the surface of the fine particle of the polymer is increased, offering better effect. Water and the water-soluble organic solvent around the fine particle of the polymer adsorbed onto the paper fibers penetrate the interior of the paper, and, hence, the amount thereof is reduced. This results in coalescence and fusing of fine particles of the polymer to form a film with the colorant, such as a pigment, incorporated therein. The ink composition containing the fine particle of the polymer having these groups does not wet the surface of a nozzle plate, which has been subjected to water repellency-imparting treatment, in a recording head of an ink jet printer. As a result, the ink composition can be highly stably ejected without causing a failure of the nozzle to eject the ink or an ink droplet trajectory directionality problem attributable to wetting of the surface of the nozzle plate by the ink composition. Further, the ink composition containing the fine particle of the polymer having the above groups has excellent storage stability.

2-2. Fine Particle of Polymer According to Second Embodiment

The fine particle of the polymer according to the second embodiment of the present invention is such that the polymer constituting the fine particle has in its structure, described below, a site possessing an ultraviolet absorbing capacity and/or a light stabilizing capability.

Sites possessing an ultraviolet absorbing capacity usable in this embodiment include benzophenone, benzotriazole, hindered phenol, salicylate, and cyanoacrylate skeletons. Sites possessing a light stabilizing capability usable herein include hindered amine skeleton.

Specific examples of these skeletons are as follows:

Benzophenone skeleton:

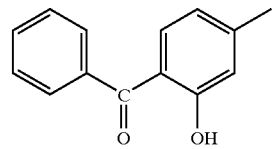

Benzotriazole skeleton:

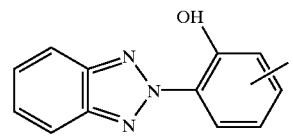

Hindered phenol skeleton:

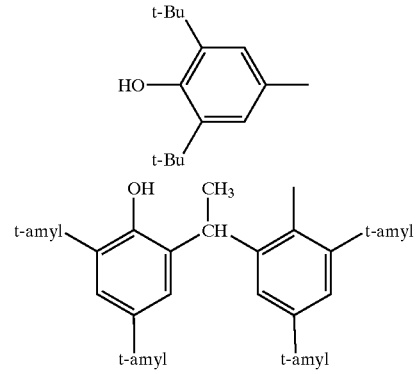

-continued

Salicylate skeleton:

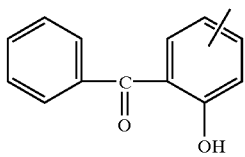

Cyanoacrylate skeleton:

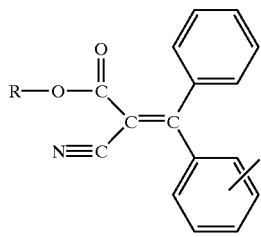

Hindered amine skeleton:

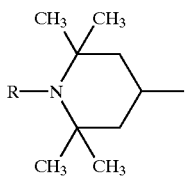

The site possessing an ultraviolet absorbing capacity and/or a light stabilizing capability may be introduced into the polymer structure by copolymerizing a copolymerizable monomer having in its molecular structure the above skeleton with another monomer.

In the present invention, an example of the monomer having a site possessing an ultraviolet absorbing capacity and/or a light stabilizing capability is a monomer having both the site possessing an ultraviolet absorbing capacity and/or a light stabilizing capability and an ethylenically unsaturated group, such as a methacryloyl, acryloyl, vinyl, or allyl group.

Specific examples thereof include the following monomers. At the outset, the following monomers may be mentioned as specific examples of monomers having an ultraviolet absorbing site with a benzophenone skeleton.

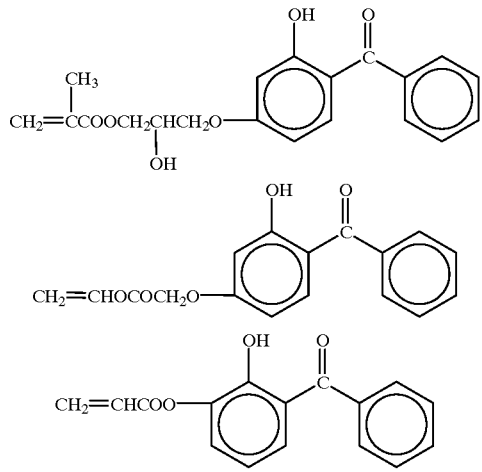

-continued

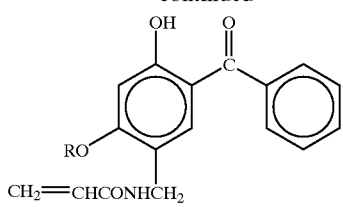

R = CH3, (CH2)7CH3.

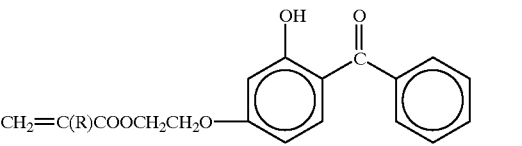

R = H, CH3

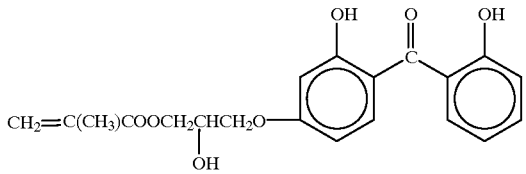

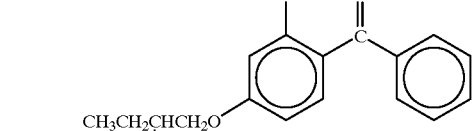

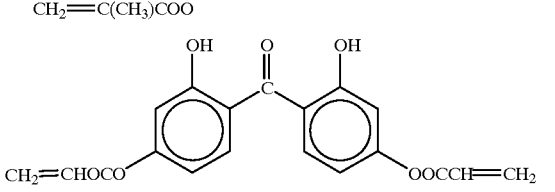

Specific examples of monomers having an ultraviolet absorbing site with a benzotriazole skeleton are as follows.

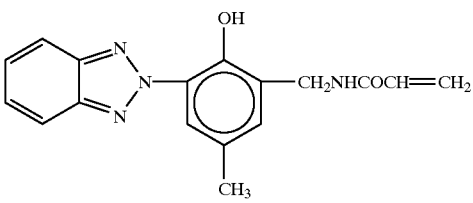

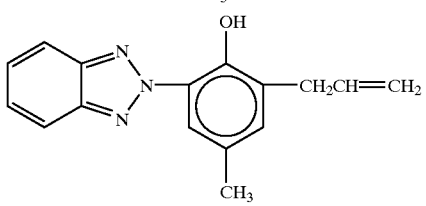

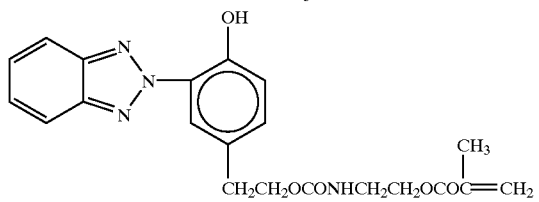

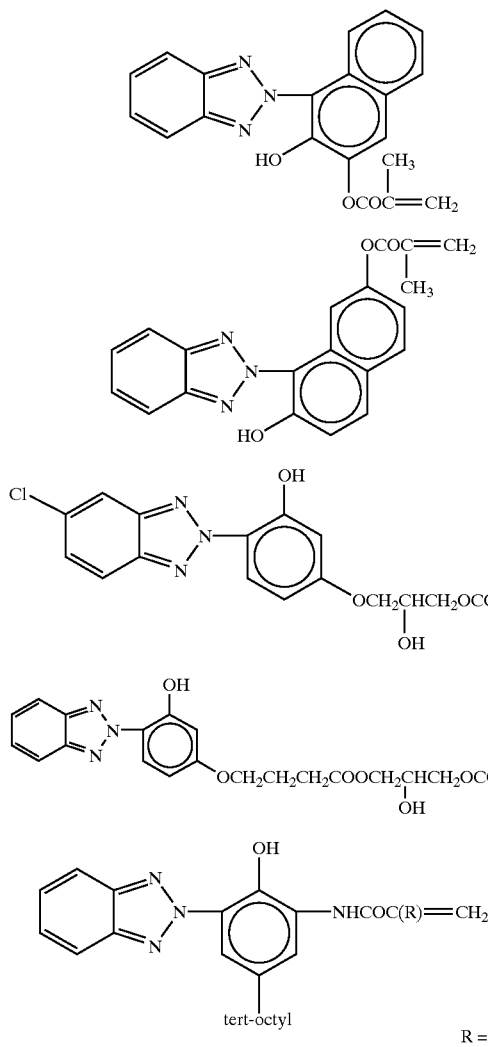
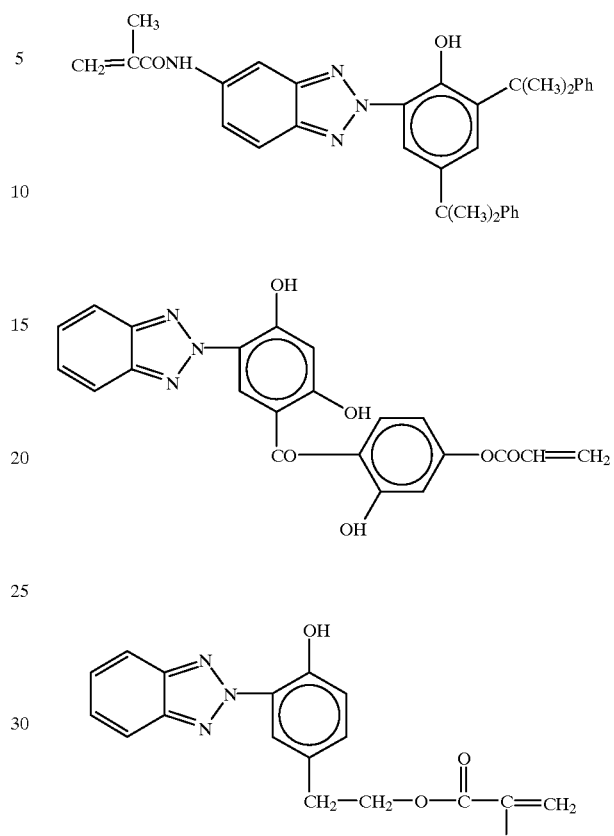
Specific examples of monomers having an ultraviolet absorbing site with a hindered phenol skeleton are as follows.
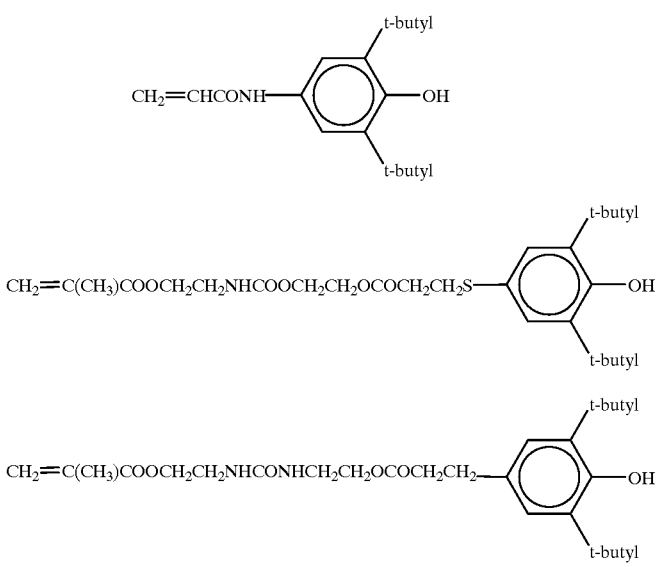

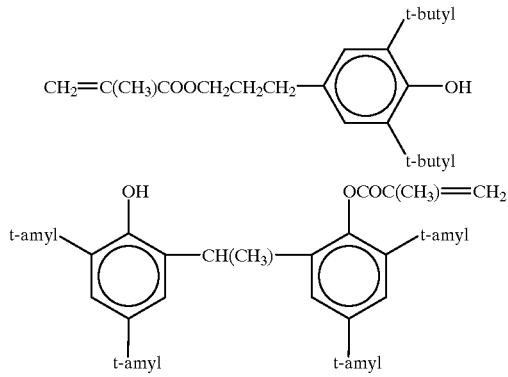

Specific examples of monomers having a light stabilizing site with a hindered amine skeleton are as follows.

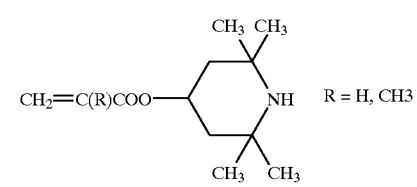

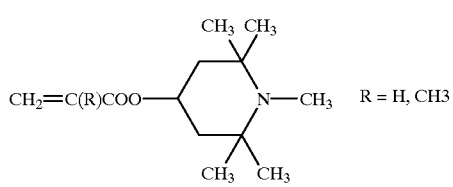

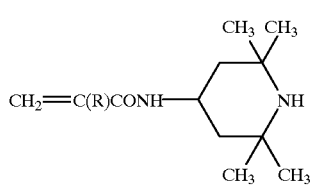

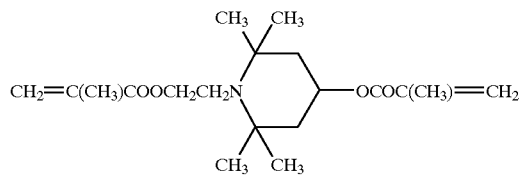

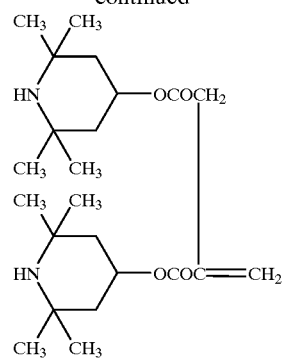

The monomer having a site possessing an ultraviolet absorbing capacity and/or a light stabilizing capability may be a commercially available one. Examples thereof include: RUVA-93 (2-(2'-hydroxy-5-methylacryloxyethylphenyl)-2H-benzotriazole), available from Otsuka Chemical Co., Ltd., as the monomer having an ultraviolet absorbing site with a benzotriazole skeleton; and ADK STAB LA-82 (1,2,2,6,6-pentamethyl-4-piperidyl methacrylate) and ADK STAB LA-87 (2,2,6,6-tetramethyl-4-piperidyl methacrylate), available from Asahi Denka Kogyo Ltd., as the monomer having a light stabilizing site with a hindered amine skeleton.

The fine particle of the polymer according to the second embodiment may be produced by a polymerization method which is properly selected by taking into consideration the kind of the monomer having a site possessing an ultraviolet absorbing capacity and/or a light stabilizing capability and the kind of another monomer.

According to a preferred embodiment of the present invention, the fine particle of the polymer according to the second embodiment used in the present invention may be produced by conventional emulsion polymerization. Specifically, it may be produced by emulsion polymerization of a monomer component for constituting the polymer and a monomer having a site possessing an ultraviolet absorbing capacity and/or a light stabilizing capability in water in the presence of a polymerization catalyst and an emulsifier.

Specific examples of monomer components for constituting the polymer usable in the second embodiment include those described above in connection with the monomer components for constituting the fine particle of the polymer according to the first embodiment. Further, specific examples of emulsifiers usable in the emulsion polymerization include those described above in connection with the first embodiment.

The fine particle of the polymer according to the second embodiment also may be in the form of a polymer emulsion which may be preferably produced by the above emulsion polymerization. The fine particle of the polymer according to the second embodiment in the form of a polymer emulsion may be a commercially available one, and example thereof include UVA-383MA and UVA-383MG manufactured by BASF.

As described above, the fine particle of the polymer may have either a single-particle structure or a core/shell structure, and, also for the fine particle of the polymer according to the second embodiment, any of these structures may be adopted.

The fine particle of the polymer having a core/shell structure according to the second embodiment may be produced in the same manner as described above in connection with the first embodiment.

When the fine particle of the polymer has a core/shell structure, the polymer having an ultraviolet absorbing capacity and/or a light stabilizing capability may constitute either the core or the shell layer, or alternatively may constitute both the core and the shell layer.

As with the fine particle of the polymer according to the first embodiment, the fine particle of the polymer according to the second embodiment preferably has either a carboxyl group or a sulfonic acid group as a functional group. Preferably, it further has an amido, hydroxyl, or amino group. When the fine particle of the polymer according to the second embodiment has a core/shell structure, preferably, these functional groups are present in the shell layer.

3. Colorant

The colorant contained in the ink composition of the present invention may be either a dye or a pigment. The pigment, however, is preferred.

Dyes usable herein include various dyes, such as direct dyes, acid dyes, foodstuff dyes, basic dyes, reactive dyes, disperse dyes, vat dyes, soluble vat dyes, and reactive disperse dyes.

Regarding the pigment, inorganic and organic pigments are usable. Examples of the inorganic pigment include, in addition to titanium oxide and iron oxide, carbon blacks produced by known processes, such as contact, furnace, and thermal processes. Examples of the organic pigment include azo pigments (including azo lake, insoluble azo pigment, condensed azo pigment, and chelate azo pigment), polycyclic pigments (for example, phthalocyanine, perylene, perinone, anthraquinone, quinacridone, dioxazine, thioindigo, isoindolinone, and quinophthalone pigments), dye chelates (for example, basic dye chelates and acid dye chelates), nitro pigments, nitroso pigments, and aniline black.

In particular, carbon blacks usable for black inks include, but are not limited to: No. 2300, No. 900, MCF 88, No. 33, No.40, No.45, No.52, MA7, MAB, MA100, No. 2200B and the like, manufactured by Mitsubishi Chemical Corporation; Raven 5750, Raven 5250, Raven 5000, Raven 3500, Raven 1255, Raven 700 and the like, manufactured by Columbian Carbon Co., Ltd.; Regal 400R, Regal 330R, Rega 1660R, Mogul L, Monarch 700, Monarch 800, Monarch 880, Monarch 900, Monarch 1000, Monarch 1100, Monarch 1300, Monarch 1400 and the like, manufactured by Cabot Corporation; and Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, and Special Black 4, manufactured by Degussa Pigments usable for yellow inks include C.I. Pigment Yellow 1, C.I. Pigment Yellow 2, C.I. Pigment Yellow 3, C.I. Pigment Yellow 12, C.I. Pigment Yellow 13, C.I. Pigment Yellow 14C, C.I. Pigment Yellow 16 , C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 114, C.I Pigment Yellow 128, C.I. Pigment Yellow 129, C.I. Pigment Yellow 151, and C.I. Pigment Yellow 154. Pigments usable for magenta inks include C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 57:1, C.I. Pigment Red 112, C.I. Pigment Red 123, C.I. Pigment Red 168, C.I. Pigment Red 184, and C.I. Pigment Red 202. Pigments usable for cyan inks include C.I. Pigment Blue 1, C.I. Pigment Blue 2, C.I. Pigment Blue 3, C.I. Pigment Blue 15:3, C.I. Pigment Blue 15:34, C.I. Pigment Blue 16, C.I. Pigment Blue 22, C.I. Pigment Blue 60, C.I. Vat Blue 4, and C.I. Vat Blue 60.

The particle diameter of the pigment is preferably not more than 10 $\mu$m, more preferably not more than 0.1 $\mu$m.

According to a preferred embodiment of the present invention, the above pigment is added, to the ink, in the form of a pigment dispersion prepared by dispersing the pigment in an aqueous medium with the aid of a dispersant or a surfactant. Preferred dispersants include those commonly used in the preparation of a dispersion of a pigment, for example, a polymeric dispersant. In this connection, that the dispersant and the surfactant contained in the dispersion of the pigment function also as the dispersant and the surfactant for the ink composition will be apparent to a person having ordinary skill in the art. Preferred examples of polymeric dispersants usable herein include naturally occurring polymers, and specific examples thereof include: proteins, such as glue, gelatin, casein, and albumin; naturally occurring rubbers, such as gum arabic and tragacanth; glucosides, such as saponin; alginic acid and alginic acid derivatives, such as propylene glycol alginate, triethanolamine alginate, and ammonium alginate; and cellulose derivatives, such as methyl cellulose, carboxymethyl cellulose, hydroxyethyl cellulose, and ethylhydroxy cellulose. Preferred polymeric dispersants usable herein include synthetic polymers, and examples thereof include polyvinyl alcohols, polyvinyl pyrrolidones, acrylic resins, such as polyacrylic acid, acrylic acid/acrylonitrile copolymer, potassium acrylate/acrylonitrile copolymer, vinyl acetate/acrylic ester copolymer, and acrylic acid/acrylic ester copolymer, styrene/acrylic resins, such as styrene/acrylic acid copolymer, styrene/methacrylic acid copolymer, styrene/methacrylic acid/acrylic ester copolymer, styrene/α-methylstyrene/acrylic acid copolymer, and styrene/α-methylstyrene/acrylic acid/acrylic ester copolymer, styrene/maleic acid copolymer, styrene/maleic anhydride copolymer, vinylnaphthalene/acrylic acid copolymer, vinylnaphthalene/maleic acid copolymer, and vinyl acetate copolymers, such as vinyl acetate/ethylene copolymer, vinyl acetate/fatty acid/ethylene copolymer, vinyl acetate/maleic ester copolymer, vinyl acetate/crotonic acid copolymer, and vinyl acetate/acrylic acid copolymer, and salts of the above polymers. Among them, a copolymer of a monomer having a hydrophobic group with a monomer having a hydrophilic group and a polymer of a monomer having both a hydrophobic group and a hydrophilic group in its molecular structure are particularly preferred.

The content of the pigment in the ink composition according to the present invention is preferably about 0.5 to 25% by weight, more preferably about 2 to 15% by weight.

4. Water-soluble Organic Solvent

The ink composition of the present invention comprises a water-soluble organic solvent. The water-soluble organic solvent is preferably a low-boiling organic solvent, and examples thereof include methanol, ethanol, n-propyl alcohol, iso-propyl alcohol, n-butanol, sec-butanol, tert-butanol, iso-butanol, and n-pentanol. Monohydric alcohols are particularly preferred. The low-boiling organic solvent has the effect of shortening the time taken for drying the ink. The amount of the low-boiling organic solvent added is preferably in the range of from 0.1 to 30% by weight, more preferably in the range of from 5 to 10% by weight, based on the ink.

According to a preferred embodiment of the present invention, the ink composition of the present invention further comprises a wetting agent comprising a high-boiling organic solvent. Preferred examples of high-boiling organic solvents usable herein include polyhydric alcohols such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, and trimethylolpropane; alkyl ethers of polyhydric alcohols, such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether; urea; 2-pyrrolidone; N-methyl-2-pyrrolidone; and 1,3-dimethyl-2-imidazolidinone.

The amount of the wetting agent added is preferably in the range of from 0.1 to 30% by weight, more preferably in the range of from 1 to 10% by weight, based on the ink.

According to a preferred embodiment of the present invention, when the glass transition point of the fine particle of the polymer is 30° C. or below or when the minimum film-forming temperature of the polymer emulsion is 30° C. or below, use of water-soluble organic solvent having a boiling point of 180° C. or above is preferred.

Preferred examples of water-soluble organic solvents having a boiling point of 180° C. or above usable herein include ethylene glycol (b.p.: 197° C.; the boiling point being hereinafter described within the parentheses), propylene glycol (187° C.), diethylene glycol (245° C.), pentamethylene glycol (242° C.), trimethylene glycol (214° C.), 2-butene-1,4-diol (235° C.), 2-ethyl-1,3-hexanediol (243° C.), 2-methyl-2,4-pentanediol (197° C.), N-methyl-2-pyrrolidone (202° C.), 1,3-dimethyl-2-imidazolidinone (257–260° C.), 2-pyrrolidone (245° C.), glycerin (290° C.), tripropylene glycol monomethyl ether (243° C.), dipropylene glycol monoethyl glycol (198° C.), dipropylene glycol monomethyl ether (190° C.), dipropylene glycol (232° C.), triethylene glycol monomethyl ether (249° C.), tetraethylene glycol (327° C.), triethylene glycol (288° C.), diethylene glycol monobutyl ether (230° C.), diethylene glycol mono-ethyl ether (202° C.), and diethylene glycol monomethyl ether (194° C.). According to a preferred embodiment of the present invention, a solvent selected from, for example, ethylene glycol, diethylene glycol, pentamethylene glycol, trimethylene glycol, 2-butene-1,4-diol, 2-ethyl-1,3-hexanediol, 2-methyl-2,4-pentanediol, glycerin, dipropylene glycol, tetraethylene glycol, triethylene glycol, N-methyl-2-pyrrolidone, 1,3-dimethyl-2-imidazolidinone, and 2-pyrrolidone, is used as the high-boiling, water-soluble solvent.

According to a preferred embodiment of the present invention, the ink composition contains a saccharide, a tertiary amine, an alkali hydroxide, or ammonia. Addition of these compounds can provide an ink composition which causes neither agglomeration of the colorant nor an increase in viscosity of the ink even after storage for a long period of time, that is, possesses excellent storage stability, and, even when allowed to stand in an open state (that is, a state of contact with air at room temperature), can maintain the fluidity and the redispersibility for a long period of time, and, in addition, does not cause clogging of nozzles during printing or at the time of restarting after interruption of printing, thus offering high ejection stability.

Saccharides, which may be added to the ink composition of the present invention, include monosaccharides, disaccharides, oligosaccharides (including trisaccharides and tetrasaccharides), and polysaccharides, and preferred examples thereof include glucose, mannose, fructose, ribose, xylose, arabinose, galactose, aldonic acid, glucitol, sorbitol, maltose, cellobiose, lactose, sucrose, trehalose, and maltotriose. The polysaccharides refer to saccharides in a wide sense and embrace materials which widely exist in the natural world, such as alginic acid, α-cyclodextrin, and cellulose. Derivatives of these saccharides include reducing sugars of the above saccharides ( for example, sugar alcohols represented by the general formula $HOCH_2(CHOH)_nCH_2OH$ wherein n is an integer of 2 to 5), oxidized sugars (for example, aldonic acid and uronic acid), amino acid, and thiosugars. Sugar alcohols are particularly preferred, and specific examples thereof include maltitol and sorbitol.

The content of the saccharide is preferably 0.1 to 40% by weight, more preferably 1 to 30% by weight, based on the ink.

Tertiary amines, which may be added to the ink composition of the present invention, include trimethylamine, triethylamine, triethanolamine, dimethylethanolamine, diethylethanolamine, triisopropenolamine, and butyldiethanolamine. They may be used alone or in combination. The amount of the tertiary amine added to the ink composition of the present invention is preferably 0.1 to 10% by weight, more preferably 0.5 to 5% by weight.

Alkali hydroxides, which may be added to the ink composition of the present invention, include potassium hydroxide, sodium hydroxide, and lithium hydroxide, and the amount of the alkali hydroxide added to the ink composition of the present invention is preferably 0.01 to 5% by weight, more preferably 0.05 to 3% by weight.

The ink composition according to the present invention may further comprise a surfactant. Examples of surfactants usable herein include anionic surfactants (for example, sodium dodecylbenzenesulfonate, sodium laurylate, and an ammonium salt of polyoxyethylene alkyl ether sulfates), nonionic surfactants (for example, polyoxyethylene alkyl ethers, polyoxyethylene alkyl esters, polyoxyethylene sorbitan fatty acid esters, polyoxyethylene alkylphenyl ethers, polyoxyethylenealkylamines, and polyoxyethylenealkylamides), and acetylene glycol (OLFINE Y and Surfynol 82, 104, 440, 465, and 485 (all the above products being manufactured by Air Products and Chemicals Inc.). They may be used alone or in combination of two or more.

The ink composition of the present invention may contain a fine particle of a general-purpose polymer in addition to the above fine particle of the polymer. Preferably, the fine particle of the general-purpose polymer is in the form of a polymer emulsion. Fine particles of general-purpose polymers usable herein include fine particles of an acrylic polymer, a vinyl acetate polymer, a styrene/butadiene copolymer, a vinyl chloride polymer, a (meth)acrylate/styrene copolymer, a butadiene polymer, and a styrenic polymer. The diameter of the fine particle of the general-purpose polymer is preferably not more than about 200 nm, more preferably about 5 to 200 nm. The fine particle of the polymer may be one which is commercially available as a polymer emulsion, and examples thereof include Microgel E-1002 and E-5002 (styrene/acrylic polymer emulsion, manufactured by Nippon Paint Co., Ltd.), Voncoat 4001 (acrylic polymer emulsion, manufactured by Dainippon Ink and Chemicals, Inc.), Voncoat 5454 (styrene/acrylic polymer emulsion, manufactured by Dainippon Ink and Chemicals, Inc.), SAE-1014 (styrene/acrylic polymer emulsion, manufactured by Nippon Zeon Co., Ltd.), and Saivinol SK-200 (acrylic polymer emulsion, manufactured by Saiden Chemical Industry Co., Ltd).

If necessary, pH adjusters, preservatives, antimolds, phosphorus antioxidants and the like may be added to the ink composition.

The ink composition of the present invention can be prepared by dispersing and mixing the above components using a suitable method. Preferably, the pigment, the polymeric dispersant, and water are first mixed together by means of a suitable dispergator (for example, a ball mill, a sand mill, an attrittor, a roll mill, an agitator mill, a Henschel mixer, a colloid mill, an ultrasonic homogenizer, a jet mill, or an angmill) to prepare a homogeneous pigment dispersion. Subsequently, a water-soluble organic solvent having a boiling point of 180° C. or above, a saccharide, a pH adjustor, a preservative, an antimold and the like are added to and satisfactorily dissolved in water, and a polymer emulsion comprising the fine particle of the polymer as a dispersed particle is added thereto, followed by thorough stirring at room temperature by means of a suitable dispergator to prepare an ink solvent. The ink solvent is added dropwise to the pigment dispersion with stirring by means of a suitable dispergator, followed by further thorough stirring. After thorough stirring, coarse particles and foreign matter causative of nozzle clogging are removed by filtration to prepare a contemplated ink composition.

5. Ink Jet Recording Method

As described above, the ink composition of the present invention is preferably used for ink jet recording. Further, the ink composition of the present invention may be preferably used for color ink jet recording using a plurality of color ink compositions. The color ink jet recording will be described with reference to the accompanying drawings.

FIG. 1 is a diagram showing an embodiment of an ink jet recording apparatus. In this embodiment, an ink composition is stored in a tank and fed into a recording head through an ink tube. Specifically, a recording head 1 comprising portions 1a and 1b is communicated with an ink tank 2 through an ink tube 3. In this case, the interior of the ink tank 2 is partitioned, and a chamber for an ink composition, optionally a plurality of chambers respectively for a plurality of color ink compositions, are provided.

The recording head 1 is moved along a carriage 4 by means of a timing belt 6 driven by a motor 5. On the other hand, paper 7 as a recording medium is placed by a platen 8 and a guide 9 at a position facing the recording head 1. In this embodiment, a cap 10 is provided. A suction pump 11 is connected to the cap 10 in order to conduct the so-called "cleaning operation." The ink composition sucked by the pump 11 is reeorvoired in a waste ink tank 13 through a tube 12.

Figure 2:
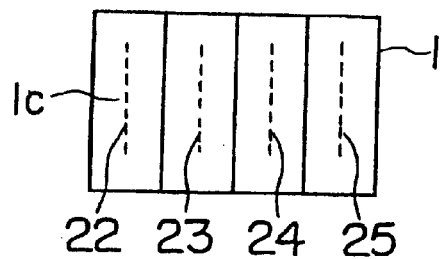
FIG. 2 is an enlarged view showing the surface of nozzles for a recording head, wherein reference character 1c designates the surface of a plurality of nozzles, arranged in longitudinal direction, through which an ink composition is ejected.

FIG. 2 is an enlarged view showing the surface of nozzles for the recording head 1. In the drawing, the surface of nozzles for the ink composition is indicated by 1c, and a yellow ink composition, a magenta ink composition, a cyan ink composition, and a black ink composition are ejected respectively through nozzles 22, 23, 24 and 25.

Figure 3:
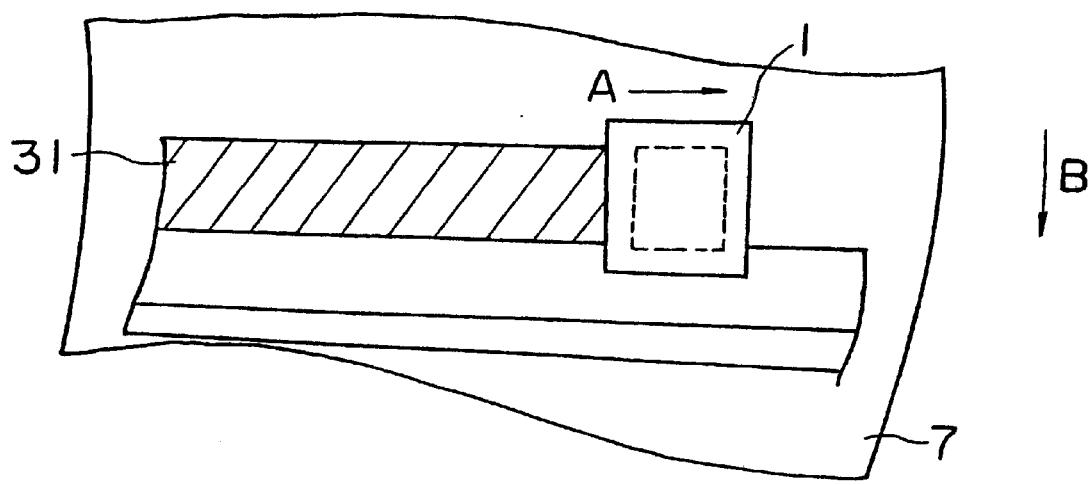
FIG. 3 is a diagram illustrating ink jet recording using the recording head shown in FIG. 2, wherein numeral 31 designates an ink composition printed region.

Further, an ink jet recording method using the recording head shown in FIG. 2 will be described with reference to FIG. 3. The recording head 1 is moved in the direction indicated by an arrow A, during which time the ink composition is printed to form a print region 31.

In the ink jet recording apparatus, the supplement of the ink composition may be carried out by replacing an ink tank in a cartridge form. The ink tank may be integral with the recording head.

Figure 4:
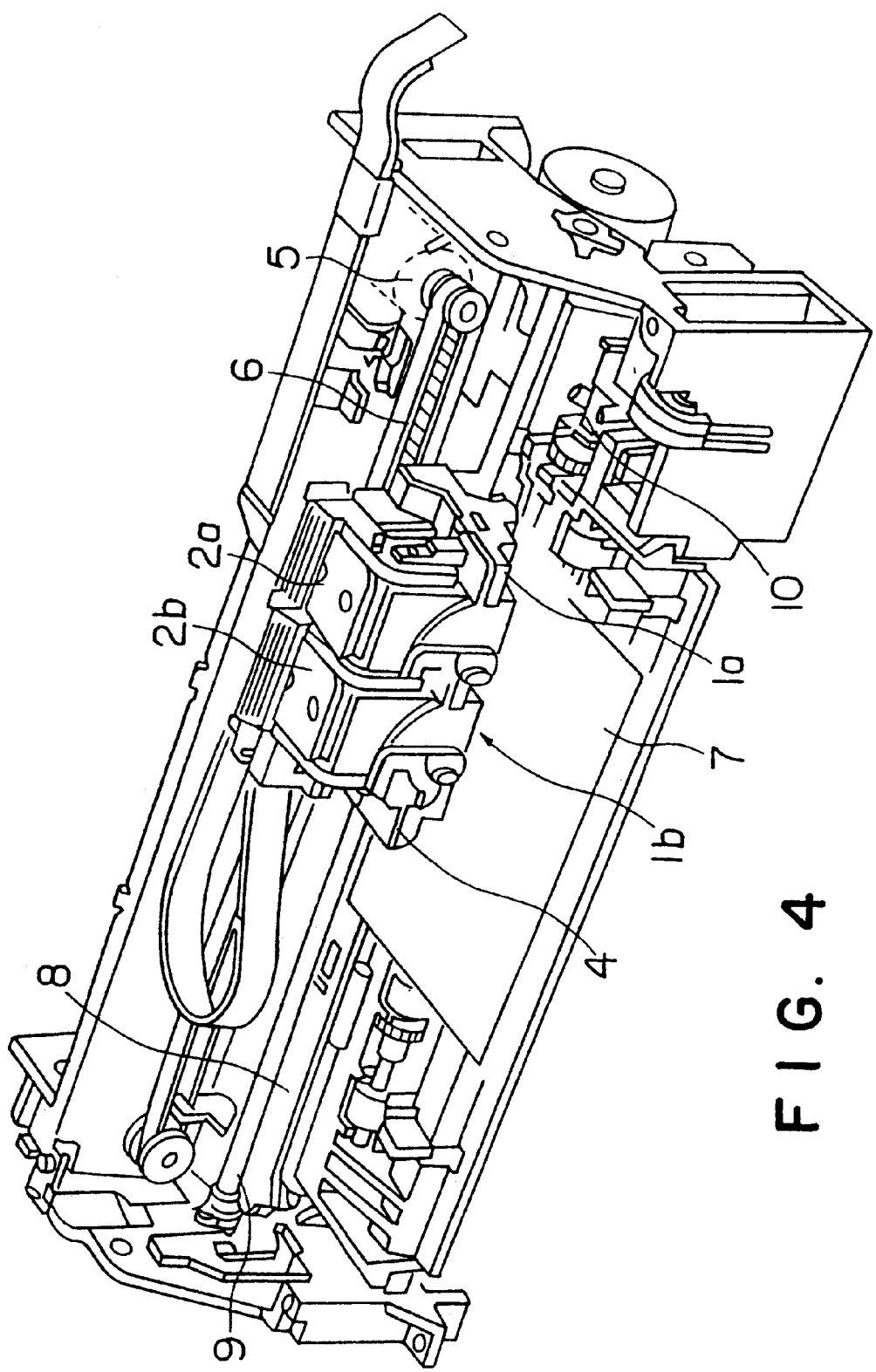
FIG. 4 is a diagram showing an ink jet recording apparatus usable in practicing the method according to the present invention, wherein a recording head is integral with an ink tank.

A preferred embodiment of an ink jet recording apparatus using such an ink tank is shown in FIG. 4. In the drawing, the same members as used in the apparatus shown in FIG. 1 have the same reference numerals. In the embodiment shown in FIG. 4, a recording head 1 comprising portions 1a and 1b is integral with an ink tank 2 comprising portions 2a and 2b. Basically, printing may be conducted in the same manner as described above in connection with the apparatus shown in FIG. 1. Further, in this embodiment, the recording head 1 is moved together with the ink tank 2 on a carriage 4.

6. Recording Method using Two Liquids

According to a preferred embodiment of the present invention, the ink composition is used for a recording method using two liquids, that is, an ink composition and a reaction solution comprising a reactant which produces an agglomerate upon contact with the ink composition This method can produce an image having excellent fixation, drying to touch, scratch/rubbing resistance, and waterfastness and good OD value and glossiness. The reason for this is believed to reside in that the reactant breaks the state of dispersion of the colorant and the polymer emulsion to create an agglomerate, thereby realizing a high-quality image which has good fixation to recording media, such as paper, and high OD value and glossiness and is free from feathering or color bleeding.

Examples of reactants which produce an agglomerate upon contact with the ink composition of the present invention include polyvalent metal salts and/or polyallylamine and/or derivatives thereof.

When the reactant is a polyvalent metal salt, preferred examples thereof include salts which are constituted by divalent or higher polyvalent metallic ions and anions bonded to the polyvalent metallic ions and are soluble in water. Specific examples of polyvalent metallic ions include divalent metallic ions, such as $Ca^{2+}$, $Cu^{2+}$, $Ni^{2+}$, $Mg^{2+}$, $Zn^{2+}$, and $Ba^{2+}$, trivalent metallic ions, such as $Al^{3+}$, $Fe^{3+}$, and $Cr^{3+}$. Specific examples of anions include $Cl^-$, $NO_3^-$, $I^-$, $Br^-$, $ClO_3^-$, and $CH_3COO^-$. Preferred are nitrate and carboxylate ions. In this case, preferably, the carboxylate ions are derived from a carboxylic acid selected from the group consisting of a saturated aliphatic monocarboxylic acid having 1 to 6 carbon atoms and a carbocyclic monocarboxylic acid having 7 to 11 carbon atoms. Preferred examples of the saturated aliphatic monocarboxylic acid having 1 to 6 carbon atoms include formic acid, acetic acid, propionic acid, isobutyric acid, valeric acid, isovaleric acid, pivalic acid, and hexanoic acid. Among them, formic acid and acetic acid are particularly preferred. A hydrogen atom(s) on the saturated aliphatic hydrocarbon residue in the monocarboxylic acid may be substituted by a hydroxyl group. Preferred examples of such carboxylic acids include benzoic acid and naphthoic acid with benzoic acid being more preferred.

The polyallylamine and polyallylamine derivative are cationic polymers which are soluble in water and can be positively charged in water. Such polymers include, for example, those represented by the following formulae (a), (b), and (c):

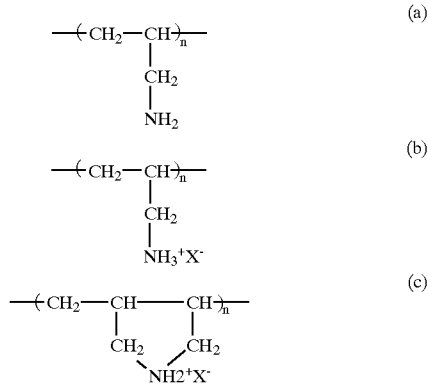

wherein X⁻ represents chloride, bromide, iodide, nitrate, phosphate, sulfate, acetate or other ion.

In addition, a copolymer of an allylamine with a diallylamine and a copolymer of diallylmethylammonium chloride with sulfur dioxide may also be used.

The reaction solution used in the present invention basically comprises a polyvalent metal salt and/or polyallylamine and/or a polyallylamine derivative and water.

The concentration of the polyvalent metal salt in the reaction solution may be properly determined so that good print quality and the effect of preventing nozzle clogging can be attained. It is preferably about 0.1 to 40% by weight, more preferably about 5 to 25% by weight, based on the reaction solution. The concentration of polyallylamine and/or the polyallylamine derivative in the reaction solution is preferably 0.5 to 10% by weight based on the reaction solution.

Further, in the present invention, preferably, the reaction solution comprises a wetting agent, such as a high-boiling organic solvent. Preferred examples of high-boiling organic solvents usable herein include those described above in connection with the ink composition. The high-boiling organic solvent functions to prevent the reaction solution from drying out, thereby preventing clogging of the head.

Although the amount of the high-boiling organic solvent added is not particularly limited, it is preferably about 0.5 to 40% by weight, more preferably about 2 to 20% by weight.

According to a more preferred embodiment of the present invention, addition of triethylene glycol monobutyl ether or glycerin as the high-boiling organic solvent is preferred. When triethylene glycol monobutyl ether and glycerin are added in combination, the amounts of triethylene glycol monobutyl ether and glycerin added are preferably about 10 to 20% by weight and about 1 to 15% by weight, respectively. Further, the above surfactant may be added to the reaction solution. In addition, if necessary, pH adjustors, such as ammonia, preservatives, antimolds and the like may be added to the reaction solution from the viewpoint of improving the storage stability.

The reaction solution may be colored by adding a color colorant so that the reaction solution can function also as an ink composition.

The reaction solution may be deposited onto the recording medium by any of an embodiment where the reaction solution is selectively deposited on only an area where the ink composition is to be deposited and an embodiment where the reaction solution is deposited on the whole surface of paper. The former embodiment can minimize the consumption of the reaction solution and, hence, is cost-effective. In this embodiment, however, an accuracy is required to some extent with respect to the position where both the reaction solution and the ink composition are deposited. On the other hand, for the latter embodiment, the requirement for the accuracy of the position where the reaction solution and the ink composition are deposited is relaxed as compared with the former embodiment. In this embodiment, however, since the reaction solution is deposited in a large amount on the whole surface of paper, the paper is likely to cause curling during drying. For the above reason, the selection of the embodiment may be determined by taking a combination of the ink composition with the reaction solution into consideration.

According to a preferred embodiment of the present invention, the ink composition and the reaction solution are applied onto a recording medium by the so-called "ink jet recording." Specifically, preferably, an ink droplet is ejected through an ink ejecting hole of an ink jet recording head and deposited on a recording medium to form an image thereon.

The ink jet recording method using the ink composition and the reaction solution according to the present invention will be described in more detail with reference to the accompanying drawings.

Figure 5:
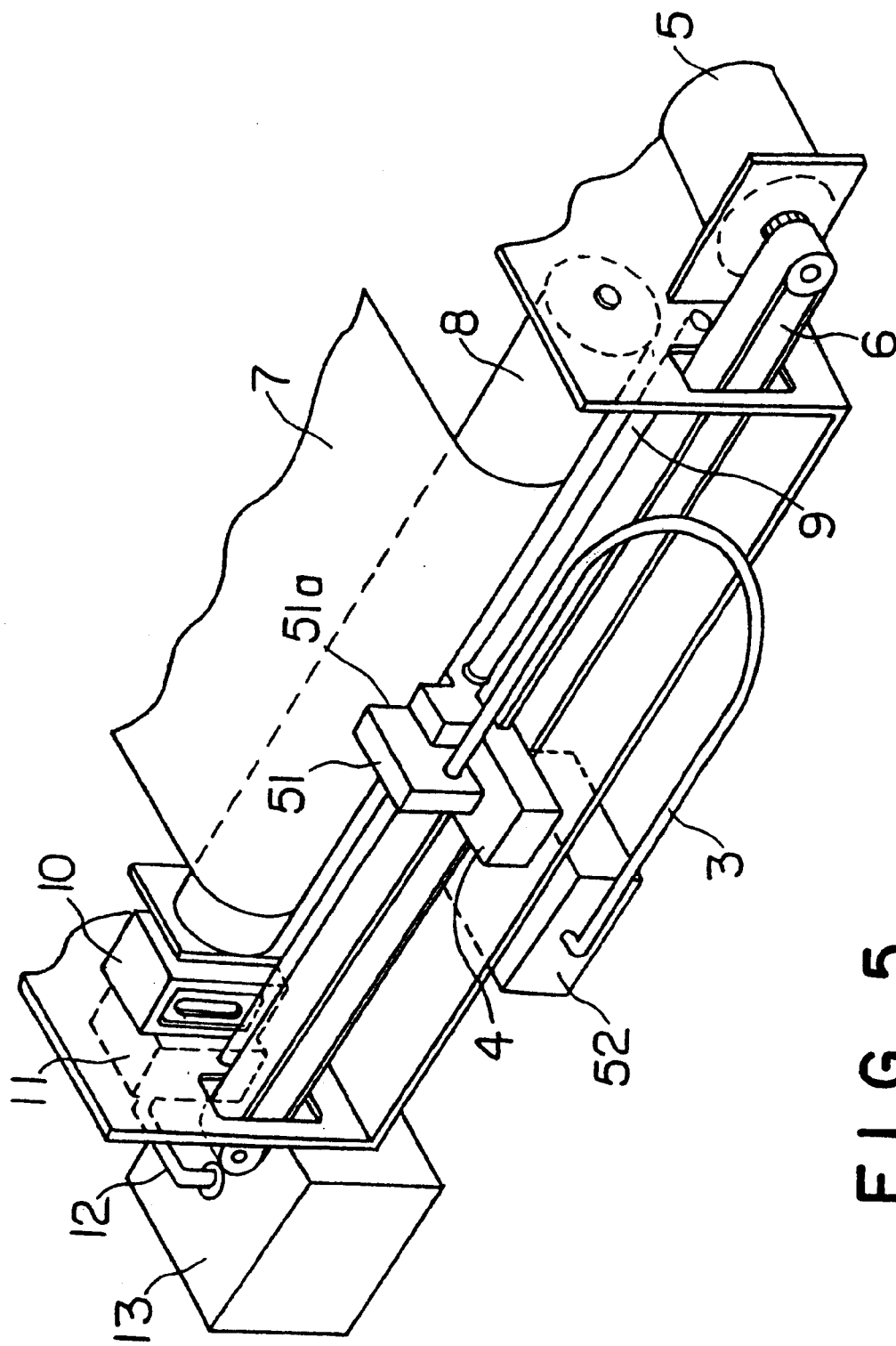
FIG. 5 is a diagram showing an ink jet recording apparatus usable in practicing the method according to the present invention, wherein a recording head is provided separately from an ink tank and an ink composition and a reaction solution are fed into the recording head through an ink tube.

FIG. 5 is a diagram showing an embodiment of an ink jet recording apparatus. In this embodiment, an ink composition and a reaction solution are accommodated in a tank and fed into a recording head through an ink tube. Specifically, a recording head 51 is communicated with an ink tank 52 through an ink tube 3. In this case, the interior of the ink tank 52 is partitioned, and a chamber for an ink composition, optionally a plurality of chambers respectively for a plurality of color ink compositions, and a chamber for a reaction solution are provided.

The recording head 51 is moved along a carriage 4 by means of a timing belt 6 driven by a motor 5. On the other hand, paper 7 as a recording medium is placed by a platen 8 and a guide 9 at a position facing the recording head 51. In this embodiment, a cap 10 is provided. A suction pump 11 is connected to the cap 10 in order to conduct the so-called "cleaning operation." The ink composition sucked by the suction pump 11 is reservoired in a waste ink tank 13 through a tube 12.

Figure 6:
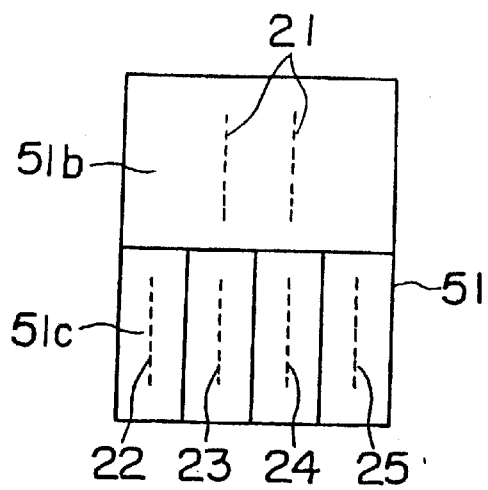
FIG. 6 is an enlarged view of the surface of nozzles for a recording head, wherein reference character 51b designates the surface of a nozzle for a reaction solution and reference character 51c the surface of a nozzle for an ink composition.

FIG. 6 is an enlarged view showing the surface of nozzles for the recording head 51. In the drawing, the surface of a nozzle for a reaction solution is indicated by 51b, and a nozzle 21 for ejecting the reaction solution is provided in the longitudinal direction. On the other hand, the surface of nozzles for the ink composition is indicated by 51c, and a yellow ink composition, a magenta ink composition, a cyan ink composition, and a black ink composition are ejected respectively through nozzles 22, 23, 24 and 25.

Figure 7:
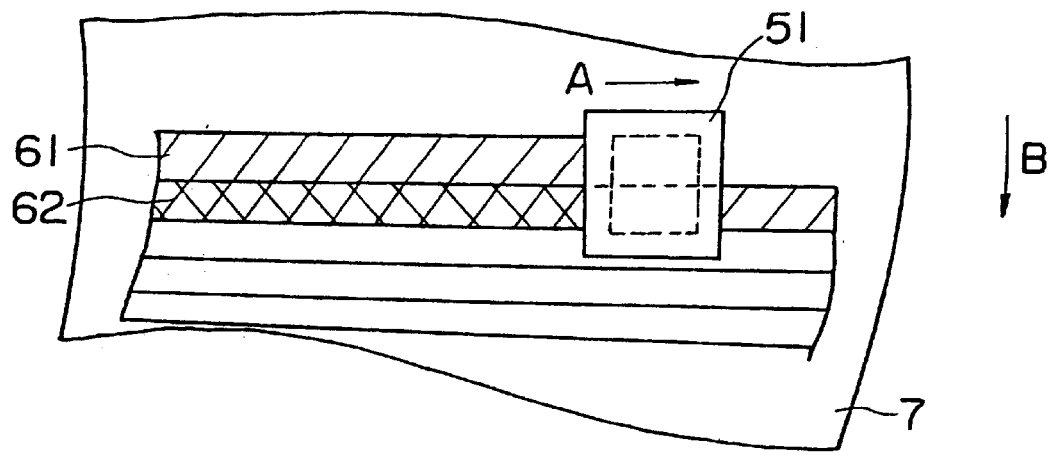
FIG. 7 is a diagram illustrating ink jet recording using the recording head shown in FIG. 2, wherein numeral 61 designates a region where a reaction solution has been deposited and numeral 62 a printed region where an ink composition has been printed on the deposited reaction solution.

Further, an ink jet recording method using the recording head shown in FIG. 6 will be described with reference to FIG. 7. The recording head 51 is moved in the direction indicated by an arrow A, during which time the reaction solution is ejected through the nozzle surface 51b to form a reaction solution-deposited region 61 in a band form on the recording medium 7. Subsequently, the recording medium 7 is transferred by a predetermined extent in the paper feed direction indicated by an arrow B, during which time the recording head 51 is moved in the direction opposite to that indicated by the arrow A in the drawing and returned to the left end of the recording medium 7, and the recording head 51 conducts printing using the ink composition on the reaction solution-deposited region, thereby forming a print region 62.

Figure 8:
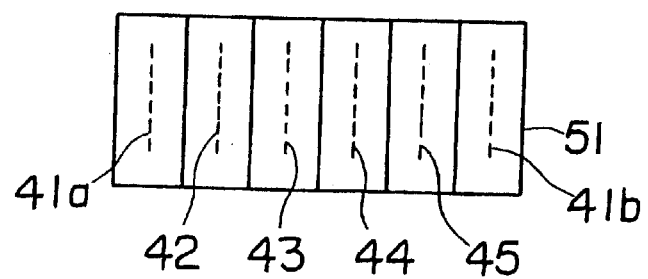
FIG. 8 is a diagram showing another embodiment of the recording head, wherein all ejection nozzles are arranged in lateral direction.

Further, as shown in FIG. 8, in the recording head 51, it is also possible to arrange all nozzles in the lateral direction to construct a nozzle assembly. In the drawing, ejection nozzles for a reaction solution are denoted by 41a and 41b, and a yellow ink composition, a magenta ink composition, a cyan ink composition, and a black ink composition are ejected respectively through nozzles 42, 43, 44 and 45. In the recording head according to this embodiment, the recording head 51, when reciprocated on the carriage, can conduct printing in both directions. Therefore, in this case, printing at a higher speed is expected as compared with the case where the recording head shown in FIG. 7 is used.

In the ink jet recording apparatus, the supplement of the ink composition may be carried out by replacing an ink tank in a cartridge form. The ink tank may be integral with the recording head.

Figure 9:
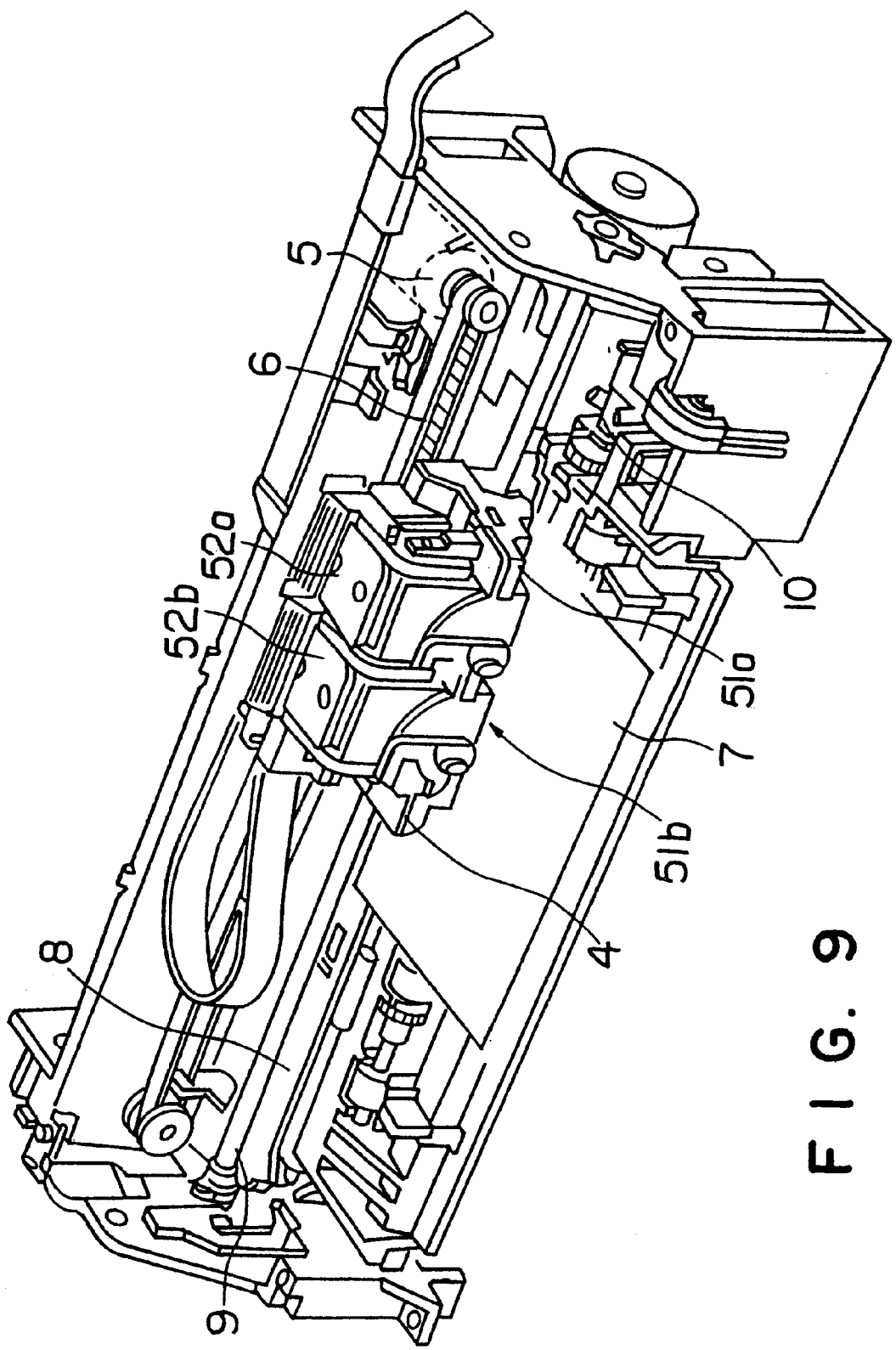
FIG. 9 is a diagram showing an ink jet recording apparatus usable in practicing the method according to the present invention, wherein a recording head is integral with an ink tank.

A preferred embodiment of an ink jet recording apparatus using such an ink tank is shown in FIG. 9. In the drawing, the same members as used in the apparatus shown in FIG. 1 have the same reference numerals. In the embodiment shown in FIG. 9, recording heads 51a and 51b are integral respectively with ink tanks 52a and 52b. An ink composition and a reaction solution are ejected respectively through the recording heads 51a and 51b. Basically, printing may be conducted in the same manner as described above in connection with the apparatus shown in FIG. 5. Further, in this embodiment, the recording head 51a is moved together with the ink tank 52a on a carriage 4, while the recording head 51a is moved together with the ink tank 52b on the carriage 4.

EXAMPLES

Polymer Emulsion 1

Distilled water (200 ml) and 0.6 g of sodium dodecylbenzenesulfonate are charged into a reactor equipped with an agitator, a reflux condenser, a dropping device, a thermometer, and a nitrogen inlet tube, and the temperature is raised to 70° C. under agitation in a nitrogen atmosphere. Potassium persulfate (2 g) is further added thereto. Separately, 40 g of butyl acrylate, 50 g of styrene, 5 g of acrylamide, 5 g of acrylic acid, 0.15 g of t-dodecylmercaptan, and 1 g of an ultraviolet absorber 2-(2'-hydroxy-5'-methylphenyl)benzotriazole (SEESORB 709, manufactured by Shipro Kasei Co., Ltd.) are mixed together to prepare a solution which is then added dropwise to the reactor. The mixture is allowed to react at 70° C. for additional 6 hr and cooled to room temperature. Aqueous ammonia is added as a neutralizing agent to adjust pH, followed by filtration through a 10-μm filter to prepare a polymer emulsion comprising a fine particle of a polymer, containing an ultraviolet absorber, as a dispersed particle. The polymer emulsion have a glass transition temperature of 20° C. and a minimum film-forming temperature of 25° C.

Polymer Emulsion 2

Distilled water (200 ml) and 0.6 g of sodium dodecylbenzenesulfonate are charged into a reactor equipped with an agitator, a reflux condenser, a dropping device, a thermometer, and a nitrogen inlet tube, and the temperature is raised to 70° C. under agitation in a nitrogen atmosphere. Potassium persulfate (2 g) is further added thereto. Separately, 40 g of butyl acrylate, 50 g of styrene, 5 g of acrylamide, 5 g of acrylic acid, 0.1 g of t-dodecylmecaptan, 5 g of a monomer having a skeleton possessing an ultraviolet absorbing capacity, 2-(2'-hydroxy-5'-methacryloxyethylphenyl)-2H-benzotriazole (RUVA-93, manufactured by Otsuka Chemical Co., Ltd.), and 1 g of a monomer having a skeleton possessing a light stabilizing capability, 1,2,2,6,6-pentamethyl-4-piperidyl methacrylate (ADK STAB LA-82, manufactured by Asahi Denka Kogyo Ltd.) are mixed together to prepare a solution which is then added dropwise to the reactor. The mixture is allowed to further react at 70° C. for 6 hours and, then, cooled to room temperature. Thereafter, the mixture is cooled to room temperature. Aqueous ammonia is added as a neutralizing agent to adjust pH, followed by filtration through a 10-μm filter to prepare a polymer emulsion comprising a fine particle of a polymer, having in its structure a site possessing an ultraviolet absorbing capacity and a light stabilizing capability, as a dispersed particle. The polymer emulsion have a glass transition temperature of 20° C. and a minimum film-forming temperature of 25° C.

Measurement of Glass Transition Point

Water contained in the polymer emulsion is evaporated to form a film of which the glass transition point is measured with a differential scanning calorimeter (DSC) at a temperature rise rate of 10° C./min.

Measurement of Minimum Film-forming Temperature

A minimum film-forming temperature measuring apparatus is set when the temperature gradient of the top surface of a sample plate made of aluminum reached equilibrium, the polymer emulsion as a sample is thinly spread on the sample plate and dried. When the sample plate is visually inspected after the completion of drying, a transparent, continuous film is formed in a temperature region above the minimum film-forming temperature, while a white powder is formed in a temperature region below the minimum film-forming temperature. The temperature of the boundary between the temperature at which the transparent, continuous film is formed and the temperature at which the white powder is formed is measured as the minimum film-forming temperature.

| Preparation of inks Color ink 1 | |
|---|---|
| (Cyan ink 1) | |
| C.I. Pigment Blue 15:3 | 2 wt % |
| Styrene/acrylic acid copolymer, ammonium salt (molecular weight 7000, polymer component 38%: dispersant) | 1 wt % |
| Polymer emulsion 1 | 5 wt % |
| Glycerin | 10 wt % |
| Maltitol | 7 wt % |
| 2-Pyrrolidone | 2 wt % |
| Triethanolamine | 1.0 wt % |
| KOH | 0.1 wt % |
| Pure water | Balance |
| (Magenta ink 1) | |
| C.I. Pigment Red 122 | 2 wt % |
| Styrene/acrylic acid copolymer, anmonium salt (molecular weight 7000, polymer component 38%: dispersant) | 1 wt % |
| Polymer emulsion 1 | 5 wt % |
| Glycerin | 10 wt % |
| Maltitol | 7 wt % |

Preparation of inks
Color ink 1

| | |
|---|---|
| 2-Pyrrolidone | 2 wt % |
| Triethanolamine | 1.0 wt % |
| KOH | 0.1 wt % |
| Pure water | Balance |
| (Yellow ink 1) | |
| C.I. Pigment Yellow 93 | 3 wt % |
| Styrene/acrylic acid copolymer, ammonium salt (molecular weight 7000, polymer component 38%: dispersant) | 1 wt % |
| Polymer emulsion 1 | 5 wt % |
| Glycerin | 10 wt % |
| Maltitol | 7 wt % |
| 2-Pyrrolidone | 2 wt % |
| Triethanolamine | 1.0 wt % |
| KOH | 0.1 wt % |
| Pure water | Balance |

An ink is prepared as follows. The pigment, the dispersent, and water are mixed together and dispersed by means of a wand mill (manufactured by Yasukawa Seisakusho) with glass beads (diameter: 1.7 mm, amount: 1.5 times, by weight, the amount of the mixture) for 2 hr. Thereafter, the glass beads are removed to prepare a pigment dispersion. Separately, the polymer emulsion 1, glycerin, maltitol, 2-pyrrolidone, triethanolamine, and potassium hydroxide are added to water, and the mixture is stirred at room temperature for 20 min. The above pigment dispersion is added dropwise to the mixture with stirring, followed by stirring for additional 20 min. The mixture is then filtered through a 5-$\mu$m membrane filter to prepare an ink for ink jet recording.

Color ink 2

| | |
|---|---|
| (Cyan ink 2) | |
| C.I. Pigment Blue 15:3 | 2 wt % |
| Styrene/acrylic acid copolymer, ammonium salt (molecular weight 7000, polymer component 38%: dispersant) | 1 wt % |
| Polymer emulsion 2 | 5 wt % |
| Glycerin | 10 wt % |
| Maltitol | 7 wt % |
| 2-Pyrrolidone | 2 wt % |
| Triethanolamine | 1.0 wt % |
| KOH | 0.1 wt % |
| Pure water | Balance |
| (Magenta ink 2) | |
| C.I. Pigment Red 122 | 2 wt % |
| Styrene/acrylic acid copolymer, ammonium salt (molecular weight 7000, polymer component 38%: dispersant) | 1 wt % |
| Polymer emulsion 2 | 5 wt % |
| Glycerin | 10 wt % |
| Maltitol | 7 wt % |
| 2-Pyrrolidone | 2 wt % |
| Triethanolamine | 1.0 wt % |
| KOH | 0.1 wt % |
| Pure water | Balance |
| (Yellow ink 2) | |
| C.I. Pigment Yellow 93 | 3 wt % |
| Styrene/acrylic acid copolymer, ammonium salt (molecular weight 7000, polymer component 38%: dispersant) | 1 wt % |
| Polymer emulsion 2 | 5 wt % |
| Glycerin | 10 wt % |
| Maltitol | 7 wt % |
| 2-Pyrrolidone | 2 wt % |
| Triethanolamine | 1.0 wt % |
| KOH | 0.1 wt % |
| Pure water | Balance |

The color ink 2 is prepared in the same manner as described above in connection with color ink 1.

Color Ink 3

In this ink, the above-described commercially available polymer emulsion comprising a fine particle of a polymer having in its structure a site possessing an ultraviolet absorbing capacity as a dispersed particle, UVA-383MA manufactured by BASF, is used. In the fine particle of the polymer, 2-hydroxy-4-(methacryloyloxyethoxy)benzophenone is used as a comonomer component having a site possessing an ultraviolet absorbing capacity. The polymer emulsion have a glass transition point of about 27° C. and a minimum film-forming temperature of 0° C. or below.

| | |
|---|---|
| (Cyan ink 3) | |
| C.I. Pigment Blue 15:3 | 2 wt % |
| Styrene/acrylic acid copolymer, ammonium salt (molecular weight 7000, polymer component 38%: dispersant) | 1 wt % |
| UVA-383MA manufactured by BASF | 5 wt % |
| Glycerin | 10 wt % |
| Maltitol | 7 wt % |
| 2-Pyrrolidone | 2 wt % |
| Triethanolamine | 1.0 wt % |
| KOH | 0.1 wt % |
| Pure water | Balance |
| (Magenta ink 3) | |
| C.I. Pigment Red 122 | 2 wt % |
| Styrene/acrylic acid copolymer, ammonium salt (molecular weight 7000, polymer component 38%: dispersant) | 1 wt % |
| UVA-383MA manufactured by BASF | 5 wt % |
| Glycerin | 10 wt % |
| Maltitol | 7 wt % |
| 2-Pyrrolidone | 2 wt % |
| Triethanolamine | 1.0 wt % |
| KOH | 0.1 wt % |
| Pure water | Balance |
| (Yellow ink 3) | |
| C.I. Pigment Yellow 93 | 3 wt % |
| Styrene/acrylic acid copolymer, ammonium salt (molecular weight 7000, polymer component 38%: dispersant) | 1 wt % |
| UVA-383MA manufactured by BASF | 5 wt % |
| Glycerin | 10 wt % |
| Maltitol | 7 wt % |
| 2-Pyrrolidone | 2 wt % |
| Triethanolamine | 1.0 wt % |
| KOH | 0.1 wt % |
| Pure water | Balance |

The color ink 3 is prepared in the same manner as described above in connection with the color ink 1.

| Color ink 4 (comparative example) | |
|---|---|
| (Cyan ink 4) | |
| C.I. Pigment Blue 15:3 | 2 wt % |
| Styrene/acrylic acid copolymer, ammonium salt (molecular weight 7000, polymer component 38%: dispersant) | 1 wt % |
| Microgel E-5002 (styrene/acrylic polymer emulsion: polymer component 29.2%, MFT about 80° C., manufactured by Nippon Paint Co., Ltd.) | 5 wt % |
| Glycerin | 10 wt % |
| Maltitol | 7 wt % |
| 2-Pyrrolidone | 2 wt % |
| Triethanolamine | 1.0 wt % |
| KOH | 0.1 wt % |
| Pure water | Balance |
| (Magenta ink 4) | |
| C.I. Pigment Red 122 | 2 wt % |
| Styrene/acrylic acid copolymer, ammonium salt (molecular weight 7000, polymer component 38%: dispersant) | 1 wt % |
| Microgel E-5002 (styrene/acrylic polymer emulsion: polymer component 29.2%, MFT about 80° C., manufactured by Nippon Paint Co., Ltd.) | 5 wt % |
| Glycerin | 10 wt % |
| Maltitol | 7 wt % |
| 2-Pyrrolidone | 2 wt % |
| Triethanolamine | 1.0 wt % |
| KOH | 0.1 wt % |
| Pure water | Balance |
| (Yellow ink 4) | |
| C.I. Pigment Yellow 93 | 3 wt % |
| Styrene/acrylic acid copolymer, ammonium salt (molecular weight 7000, polymer component 38%: dispersant) | 1 wt % |
| Microgel E-5002 (styrene/acrylic polymer emulsion: polymer component 29.2%, MFT about 80° C., manufactured by Nippon Paint Co., Ltd.) | 5 wt % |
| Glycerin | 10 wt % |
| Maltitol | 7 wt % |
| 2-Pyrrolidone | 2 wt % |
| Triethanolamine | 1.0 wt % |
| KOH | 0.1 wt % |
| Pure water | Balance |

The color ink 4 is prepared in the same manner as described above in connection with the color ink 1.

| Color ink 5 (comparative example) | |
|---|---|
| (Cyan ink 5) | |
| C.I. Pigment Blue 15:3 | 2 wt % |
| Styrene/acrylic acid copolymer, ammonium salt (molecular weight 7000, polymer component 38%: dispersant) | 1 wt % |
| Glycerin | 10 wt % |
| Maltitol | 7 wt % |
| 2-Pyrrolidone | 2 wt % |
| Triethanolamine | 1.0 wt % |
| KOH | 0.1 wt % |
| Pure water | Balance |
| (Magenta ink 5) | |
| C.I. Pigment Red 122 | 2 wt % |
| Styrene/acrylic acid copolymer, ammonium salt (molecular weight 7000, polymer component 38%: dispersant) | 1 wt % |
| Glycerin | 10 wt % |
| Maltitol | 7 wt % |
| 2-Pyrrolidone | 2 wt % |
| Triethanolamine | 1.0 wt % |
| KOH | 0.1 wt % |
| Pure water | Balance |
| (Yellow ink 5) | |
| C.I. Pigment Yellow 93 | 3 wt % |
| Styrene/acrylic acid copolymer, ammonium salt (molecular weight 7000, polymer component 38%: dispersant) | 1 wt % |
| Glycerin | 10 wt % |
| Maltitol | 7 wt % |
| 2-Pyrrolidone | 2 wt % |
| Triethanolamine | 1.0 wt % |
| KOH | 0.1 wt % |
| Pure water | Balance |

The color ink 5 is prepared in the same manner as described above in connection with the color ink 1.

| Preparation of reaction solutions | |
|---|---|
| (Reaction solution 1) | |
| Magnesium nitrate hexahydrate | 25 wt % |
| Triethylene glycol monobutyl ether | 10 wt % |
| Glycerin | 20 wt % |
| Pure water | Balance |
| (Reaction solution 2) | |
| Polyallylamine represented by formula (a) | 5 wt % |
| Triethylene glycol monobutyl ether | 10 wt % |
| Glycerin | 20 wt % |
| Pure water | Balance |

Evaluation Test

Evaluation 1

Lightfastness

Printing Method

For each of yellow, magenta, and cyan inks in the color inks 1 to 5, a blotted image of 3 cm×3 cm is printed (100% duty) on plain papers, i.e., Xerox 4024 and Xerox P, and a specialty paper for ink jet recording (manufactured by Seiko Epson Corporation) by means of an ink jet recording apparatus shown in FIG. 1.

Example 1: A record with the color ink 1 according to the above printing method.

Example 2: A record with the color ink 2 according to the above printing method.

Example 3: A record with the color ink 3 according to the above printing method.

Comparative Example 1: A record with the color ink 4 according to the above printing method.

Comparative Example 2: A record with the color ink 5 according to the above printing method.

The reaction solution 1 and each of yellow, magenta, and cyan inks in the color inks 1 to 5 are printed (100% duty) on plain papers, i.e., Xerox 4024 and Xerox P, and a specialty paper for ink jet recording (manufactured by Seiko Epson Corporation) by means of an ink jet recording apparatus shown in FIG. 5 to yield blotted images of 3 cm×3 cm.

Example 4: A record with the reaction solution 1 and the color ink 1 according to the above printing method.

Example 5: A record with the reaction solution 1 and the color ink 2 according to the above printing method.

Example 6: A record with the reaction solution 1 and the color ink 3 according to the above printing method.

Comparative Example 3: A record with the reaction solution 1 and the color ink 4 according to the above printing method.

Comparative Example 4: A record with the reaction solution 1 and the color ink 5 according to the above printing method.

Evaluation Method

Records of blotted images yielded by the above methods are subjected to a 600-hr exposure test using a xenon fadeometer. For the blotted image area, the color before exposure and the color after exposure are measured with a Macbeth CE-7000 spectrophotometer (manufactured by Macbeth) and expressed in terms of the L*a*b* color system of the color difference indication method specified in CIE (Commission International de l'Eclairage), and a change in color between before the exposure and after the exposure in the blotted image area is expressed in terms of the color difference determined by the following equation.

Color difference:

$$\Delta E^*ab = [(\Delta L^*)^2 + (\Delta a^*)^2 + (\Delta b^*)^2]^{1/2}$$

The value is evaluated according to the following criteria.

$\Delta E^*ab \leq 10$   A:

$10 < \Delta E^*ab \leq 20$   B:

$\Delta E^*ab > 20$   C:

Further, for the blotted image area, the color density before the exposure and the color density after the exposure is measured with a Macbeth densitometer TR927 (manufactured by Macbeth), and a change in color density between before and after the exposure in the blotted image area is evaluated according to the following criteria.

A: OD value change of not more than 5%
B: OD value change of 5 to 10%
C: OD value change of not less than 10%

The results of evaluation are as summarized in the following table.

TABLE 1

Evaluation 1: Lightfastness (reaction solution not used)

|  |  |  | Lightfastness | |
| --- | --- | --- | --- | --- |
|  | Color ink | Reaction solution | Difference in color between before and after exposure | Difference in OD value between before and after exposure |
| Ex. 1 | 1 | Cyan | None | A | A |
|  |  | Magenta |  | A | A |
|  |  | Yellow |  | B | B |
| Ex. 2 | 2 | Cyan | None | A | A |
|  |  | Magenta |  | A | A |
|  |  | Yellow |  | A | A |

TABLE 1-continued

Evaluation 1: Lightfastness (reaction solution not used)

|  |  |  | Lightfastness | |
| --- | --- | --- | --- | --- |
|  | Color ink | Reaction solution | Difference in color between before and after exposure | Difference in OD value between before and after exposure |
| Ex. 3 | 3 | Cyan | None | A | A |
|  |  | Magenta |  | A | A |
|  |  | Yellow |  | A | A |
| Comp. Ex. 1 | 4 | Cyan | None | A | A |
|  |  | Magenta |  | B | B |
|  |  | Yellow |  | C | C |
| Comp. Ex. 2 | 5 | Cyan | None | A | A |
|  |  | Magenta |  | B | B |
|  |  | Yellow |  | C | C |

TABLE 2

Evaluation 1: Lightfastness (reaction solution used)

|  |  |  | Lightfastness | |
| --- | --- | --- | --- | --- |
|  | Color ink | Reaction solution | Difference in color between before and after exposure | Difference in OD value between before and after exposure |
| Ex. 4 | 1 | Cyan | 1 | A | A |
|  |  | Magenta |  | A | A |
|  |  | Yellow |  | B | B |
| Ex. 5 | 2 | Cyan | 1 | A | A |
|  |  | Magenta |  | A | A |
|  |  | Yellow |  | A | A |
| Ex. 6 | 3 | Cyan | 1 | A | A |
|  |  | Magenta |  | A | A |
|  |  | Yellow |  | A | A |
| Comp. Ex. 3 | 4 | Cyan | 1 | A | A |
|  |  | Magenta |  | B | B |
|  |  | Yellow |  | C | C |
| Comp. Ex. 4 | 5 | Cyan | 1 | A | A |
|  |  | Magenta |  | B | B |
|  |  | Yellow |  | C | C |

Evaluation 2

Print Quality

Feathering

The reaction solution 1 or 2 and each of yellow, magenta, and cyan inks in the color inks 1 to 5 are printed on the following papers by means of an ink jet recording apparatus shown in FIG. 5. Combination of the reaction solution with the color ink is as follows.

Example 7: A record with the reaction solution 1 and the color ink 1 according to the above printing method.

Example 8: A record with the reaction solution 1 and the color ink 2 according to the above printing method.

Example 9: A record with the reaction solution 2 and the color ink 1 according to the above printing method.

Example 10: A record with the reaction solution 2 and the color ink 2 according to the above printing method.

Comparative Example 5: A record with the color ink 4 according to the above printing method.

Comparative Example 6: A record with the reaction solution 1 and the color ink 5 according to the above printing method.

In the printing, the reaction solution is first printed (100% duty), and 24 alphabetical characters are printed using a color ink of each color. For both the reaction solution and the ink, the ejection rate is 0.07 μg/dot, and the density is 360 dpi.

The following recording papers are used for the evaluation.

(1) Xerox P Paper (Xerox Corp.)
(2) Ricopy 6200 Paper (Ricoh Co. Ltd.)
(3) Xerox 4024 Paper (Xerox Corp.)
(4) Neenah Bond Paper (Kimberly-Clark)
(5) Xerox R Paper (Xerox Corp., recycled paper)
(6) Yamayuri paper (recycled paper, manufactured by Honshu Paper Co., Ltd., )

The characters in the records are visually inspected for feathering and evaluated as follows.

A: The characters are free from feathering and sharp for all the papers.
B: Feathering is created for some papers.
C: Feathering is created for all the papers.
D: Remarkable feathering is created which rendered the outline of the letter blurry.

The results of evaluation are as summarized in the following table.

TABLE 3

Evaluation 2: Print quality (feathering)

|  | Color ink | Reaction solution | Print quality (feathering) |
|---|---|---|---|
| Ex. 7 | 1 Cyan | 1 | B |
|  | Magenta |  | B |
|  | Yellow |  | B |
| Ex. 8 | 2 Cyan | 1 | A |
|  | Magenta |  | A |
|  | Yellow |  | A |
| Ex. 9 | 1 Cyan | 2 | B |
|  | Magenta |  | B |
|  | Yellow |  | B |
| Ex. 10 | 2 Cyan | 2 | A |
|  | Magenta |  | A |
|  | Yellow |  | A |
| Comp. Ex. 5 | 4 Cyan | None | D |
|  | Magenta |  | D |
|  | Yellow |  | D |
| Comp. Ex. 6 | 5 Cyan | 1 | C |
|  | Magenta |  | C |
|  | Yellow |  | C |

Evaluation 3

Rubbing/Scratch Resistance

Line Marking Resistance

The records prepared in the evaluation 1 are dried at room temperature for 24 hr, and the printed characters in the records are rubbed with a water-base fluorescent marker pen (ZEBRA PEN 2 (™)) manufactured by ZEBRA at a marking force of $4.9 \times 10^5$ N/m$^2$ and visually inspected for staining. The results are evaluated according to the following criteria.

A: No stain is created by marking twice.
B: Stain is created by marking once.

The results of evaluation are as summarized in the following table.

TABLE 4

Evaluation 3: Rubbing/scratch resistant

|  | Color ink | Reaction solution | Rubbing/scratch resistance |
|---|---|---|---|
| Ex. 4 | 1 Cyan | 1 | A |
|  | Magenta |  | A |
|  | Yellow |  | A |
| Ex. 5 | 2 Cyan | 1 | A |
|  | Magenta |  | A |
|  | Yellow |  | A |
| Ex. 6 | 3 Cyan | 1 | A |
|  | Magenta |  | A |
|  | Yellow |  | A |
| Comp. Ex. 3 | 4 Cyan | 1 | B |
|  | Magenta |  | B |
|  | Yellow |  | B |
| Comp. Ex. 4 | 4 Cyan | 1 | B |
|  | Magenta |  | B |
|  | Yellow |  | B |

Evaluation 4

Color Bleeding

The reaction solution 1 and each of yellow, magenta, and cyan inks in the color inks 1 to 5 are printed on the following papers by means of an ink jet recording apparatus shown in FIG. 5. Combination of the reaction solution with the color ink is as follows.

Example 11: A record with the reaction solution 1 and the color ink 1 according to the above printing method.

Example 12: A record with the reaction solution 1 and the color ink 2 according to the above printing method.

Example 13: A record with the reaction solution 2 and the color ink 1 according to the above printing method.

Comparative Example 7: A record with the color ink 4 alone without using the reaction solution according to the above printing method.

Comparative Example 8: A record with the reaction solution 1 and the color ink 5 according to the above printing method.

The following recording papers are used for the evaluation.

(1) Xerox P Paper (Xerox Corp.)
(2) Ricopy 6200 Paper (Ricoh Co. Ltd.)
(3) Xerox 4024 Paper (Xerox Corp.)
(4) Neenah Bond Paper (Kimberly-Clark)
(5) Xerox R Paper (Xerox Corp., recycled paper)
(6) Yamayuri paper (recycled paper, manufactured by Honshu Paper Co., Ltd., )

In the printing, the reaction solution is first printed (100% duty), and each color in the color ink (cyan, magenta, and yellow) is then printed. The prints are visually inspected for the presence of uneven color-to-color mixing in the color boundaries and evaluated according to the following criteria. For both the reaction solution and the ink, the ejection rate is 0.07 μg/dot, and the density is 360 dpi.

A: No color-to-color mixing is created with clear color boundaries.
B: Feather-like color-to-color mixing is created.
C: Significant color-to-color mixing is created rendering color boundaries unclear.

The results of evaluation are as summarized in the following table.

TABLE 5

Evaluation 4: Color breeding

| | Color ink | Reaction solution | Color bleeding |
|---|---|---|---|
| Ex. 11 | 1 | 1 | B |
| Ex. 12 | 2 | 1 | A |
| Ex. 13 | 3 | 1 | B |
| Comp. Ex. 7 | 4 | None | C |
| Comp. Ex. 8 | 5 | 1 | B |

Evaluation 5

Storage Stability

The following ink composition (50 cc) is placed in a sample bottle made of glass and allowed to stand at 60° C. for two weeks to check for a change in viscosity and creation of deposits and unfavorable products.

Example 15: The color ink 1 is used in this test.
Example 16: The color ink 2 is used in this test.
Example 17: The color ink 3 is used in this test.
Comparative Example 9: The color ink 4 is used in this test.
Comparative Example 10: The color ink 5 is used in this test.

The results are evaluated according to the following criteria.

A: Neither creation of deposits and unfavorable products nor a change in viscosity is observed.
B: A change in viscosity occurred although creation of deposits and unfavorable products is not observed.
C: Deposits or unfavorable products are created.

The results of evaluation are as summarized in Table 6.

Evaluation 6

Reliability Toward Clogging

Each of the yellow, magenta, and cyan inks in the color inks 1 to 5 is filled into the head of an ink jet recording apparatus shown in FIG. 1, and alphanumeric characters are continuously printed for 10 min. The printer is then stopped and allowed to stand without capping under an environment of temperature 40° C. and humidity 25% for one week. Thereafter, alphanumeric characters are printed again to determine the number of cleaning operations necessary for offering the same print quality as that before the standing.

The ink compositions used in this test are as follows.
Example 15: The color ink 1 is used in this test.
Example 16: The color ink 2 is used in this test.
Example 17: The color ink 3 is used in this test.
Comparative Example 9: The color ink 4 is used in this test.
Comparative Example 10: The color ink 5 is used in this test.

The results are evaluated according to the following criteria.

A: 0 to twice
B: 3 to 5 times
C: Not less than 6 times

The results of evaluation are as summarized in Table 6.

Evaluation 7

Ejection Stability

The ink composition is filled into an ink jet printer MJ-700V2C (manufactured by Seiko Epson Corporation), and alphabetical characters are continuously printed at room temperature at an ejection rate of 0.7 μg/dot and a density of 360 dpi. Dropouts and scattering of the ink are inspected, and the time taken for dropouts or scattering of the ink to occur ten times in total is measured.

The ink compositions used in this test are as follows.
Example 15: The color ink 1 is used.
Example 16: The color ink 2 is used.
Example 17: The color ink 3 is used.
Comparative Example 9: The color ink 4 is used.
Comparative Example 10: The color ink 5 is used.

The results are evaluated according to the following criteria.

A: Not less than 48 hr
B: 24 to less than 48 hr
C: 1 to less than 24 hr
D: Less than 1 hr The results of evaluation are as summarized in the following table.

TABLE 6

| | Color ink | Evaluation 5 Storage stability | Evaluation 6 Reliability toward clogging | Evaluation 7 Ejection stability |
|---|---|---|---|---|
| Ex. 15 | 1 | B | B | B |
| Ex. 16 | 2 | B | B | A |
| Ex. 17 | 3 | B | B | B |
| Comp. Ex. 9 | 4 | B | C | B |
| Comp. Ex. 10 | 5 | D | D | D |

What is claimed is:

1. An ink composition comprising a colorant, water, a water-soluble organic solvent, and a fine particle of a polymer, wherein the polymer of the fine particle has in its structure a site possessing an ultraviolet absorbing capacity and a site possessing light stabilizing capability, wherein the polymer has a film forming property, and wherein the site possessing the ultraviolet absorbing capacity is selected from the group consisting of benzophenone skeleton, benzotriazole skeleton, hindered phenol skeleton, salicylate skeleton, and cyanoacrylate skeleton, and the site possessing light stabilizing capability is hindered amine skeleton.

2. The ink composition according to claim 1, wherein the fine particle has a glass transition point of 30° C. or below.

3. The ink composition according to claim 2, wherein the water-soluable organic solvent has a boiling point of 180° C. or above.

4. The ink composition according to claim 1, wherein the polymer of the fine particle comprises a thermoplastic polymer.

5. The ink composition according to claim 4, wherein the thermoplastic polymer is selected from the group consisting of an ethylene/vinyl acetate copolymer, an ethylene/ethyl acrylate copolymer, polyethylene, polypropylene, polystyrene, a poly(meth)acrylic ester, a (meth)acrylic acid/styrene copolymer, a (meth)acrylic ester/(meth)acrylic acid copolymer, a styrene/maleic acid copolymer, a styrene/itaconic ester copolymer, polyvinyl acetate, polyester, polyurethane, and polyamide.

6. The ink composition according to claim 1, wherein the fine particle has a single-particle structure.

7. The ink composition according to claim 6, wherein the fine particle has either a carboxyl group or a sulfonic acid group as a functional group.

8. The ink composition according to claim 1, wherein the fine particle of the polymer has a core/shell structure comprising a core and a shell surrounding the core.

9. The ink composition according to claim 8, wherein the shell layer has either a carboxyl group or a sulfonic acid group as a functional group.

10. The ink composition according to claim 1, wherein the fine particle has a diameter of 5 to 200 nm.

11. The ink composition according to claim 1, wherein the fine particle of the polymer is dispersed as a dispersed particle of a polymer emulsion in the ink composition.

12. The ink composition according to claim 11, wherein the polymer emulsion has a minimum film-forming temperature of 30° C. or below.

13. The ink composition according to claim 12, wherein the water-soluble organic solvent has a boiling point of 180° C. or above.

14. The ink composition according to claim 1, wherein the colorant is a dye or a pigment.

15. A recording method comprising the step of depositing an ink composition onto a recording medium to conduct printing on the recording medium, wherein the ink composition is one according to claim 1.

16. An ink jet recording method comprising the steps of:

ejecting droplets of an ink composition; and depositing the droplets onto a recording medium to conduct printing on the recording medium, wherein the ink composition is one according to claim 1.

17. A recording method comprising the step of depositing the ink composition according to claim 1 and a reaction solution containing a reactant, which produces an agglomerate upon contact with the ink composition, onto a recording medium to form an image.

18. The recording method according to claim 17, wherein the ink composition and/or the reaction solution are deposited by ink jet recording onto the recording medium.

19. The recording method according to claim 18, wherein the reaction solution comprises at least a reactant, a water-soluble organic solvent, and water.

20. The recording method according to claim 19, wherein the reactant is a polyvalent metal salt, a polyallylamine, or a polyallylamine derivative.

* * * * *